US011882487B2

(12) United States Patent
Chaponniere et al.

(10) Patent No.: US 11,882,487 B2
(45) Date of Patent: Jan. 23, 2024

(54) TECHNIQUES FOR EFFICIENT MOBILITY USING RELAY DEVICES

(71) Applicant: QUALCOMM Incorporated, San Diego, CA (US)

(72) Inventors: Lenaig Genevieve Chaponniere, La Jolla, CA (US); Hong Cheng, Basking Ridge, NJ (US); Haris Zisimopoulos, London (GB); Francesco Pica, San Diego, CA (US); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/512,122

(22) Filed: Oct. 27, 2021

(65) Prior Publication Data

US 2022/0141727 A1 May 5, 2022

Related U.S. Application Data

(60) Provisional application No. 63/107,735, filed on Oct. 30, 2020.

(51) Int. Cl.
*H04W 36/00* (2009.01)
*H04W 72/30* (2023.01)
*H04W 84/00* (2009.01)
*H04W 88/04* (2009.01)

(52) U.S. Cl.
CPC ... *H04W 36/0058* (2018.08); *H04W 36/0007* (2018.08); *H04W 36/0069* (2018.08); *H04W 36/00837* (2018.08); *H04W 72/30* (2023.01); *H04W 84/005* (2013.01); *H04W 88/04* (2013.01)

(58) Field of Classification Search
CPC ......... H04W 36/0058; H04W 36/0007; H04W 36/0069; H04W 36/00837; H04W 72/30; H04W 84/005; H04W 88/04; H04W 36/03; H04W 48/20; H04W 48/16; H04W 48/12
See application file for complete search history.

(56) References Cited

U.S. PATENT DOCUMENTS

| | | | |
|---|---|---|---|
| 2021/0307098 A1* | 9/2021 | Chae | H04W 76/15 |
| 2022/0094481 A1* | 3/2022 | Hong | H04L 1/1812 |
| 2022/0124694 A1* | 4/2022 | Hong | H04L 5/0058 |
| 2022/0408285 A1* | 12/2022 | Hong | H04L 27/26025 |

OTHER PUBLICATIONS

Mori, Shota, Keiichi Mizutani, and Hiroshi Harada. "Software-Defined Radio-Based 5G Physical Layer Experimental Platform for Highly Mobile Environments." IEEE Open Journal of Vehicular Technology 4 (2023): 230-240. (Year: 2023).*

* cited by examiner

*Primary Examiner* — Sharad Rampuria
(74) *Attorney, Agent, or Firm* — Holland & Hart LLP

(57) ABSTRACT

Methods, systems, and devices for wireless communications are described. A user equipment (UE) and a base station may determine whether the UE is inside or outside of a vehicle with a relay device. Techniques for determining whether the UE is inside or outside of the vehicle are described herein. The UE may determine whether to camp on a cell of the relay device based on whether the UE is inside or outside the vehicle. The base station may perform connected mode mobility for the UE based on whether the UE is inside or outside the vehicle.

30 Claims, 16 Drawing Sheets

TECHNIQUES FOR EFFICIENT MOBILITY USING RELAY DEVICES

CROSS REFERENCE

The present Application for Patent claims the benefit of U.S. Provisional Patent Application No. 63/107,735 by CHAPONNIERE, entitled "TECHNIQUES FOR EFFICIENT MOBILITY USING RELAY DEVICES," filed Oct. 30, 2020, assigned to the assignee hereof, and expressly incorporated by reference herein.

FIELD OF TECHNOLOGY

The following relates to wireless communications, including techniques for efficient mobility using relay devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for efficient mobility using relay devices. Generally, the described techniques provide for idle mode camping and connected mode mobility based on whether a user equipment (UE) is inside or outside a vehicle equipped with a relay device. For example, a UE may be in a vicinity of a relay device. The UE or a base station, or both, may implement techniques to determine if the UE is inside or outside the vehicle equipped with the relay device. In some cases, the UE may determine if the UE is inside the vehicle or is outside the vehicle (e.g., has exited the vehicle) for idle mode camping. The network (e.g., the base station or the relay device, or both) may determine whether the UE is inside the vehicle or outside the vehicle (e.g., has exited the vehicle) for connected mode mobility.

If a UE is operating in an idle mode, the UE may be biased toward camping on, or associating with, a relay device for as long as the UE is inside a vehicle with the relay device. In some cases, the network may manage mobility for a UE operating in a connected mode. If the network determines that the UE is inside the vehicle, the network may hand the UE over to the relay device mounted on the vehicle. If the network determines that the UE in the connected mode has exited the vehicle, the network may hand the UE over to a base station. In some cases, the network may determine that the UE is outside the vehicle. If the UE is outside the vehicle, the relay device may be configured as a secondary link for the UE, but the network may not hand the UE over from the base station to the relay device.

Techniques for determining whether a UE is inside a vehicle with a relay device are described herein. Some techniques determine whether the UE is inside or outside the vehicle based on synchronization signal/physical broadcast channel (SS/PBCH) block measurements for different antennas of the relay device. Some techniques determine whether the UE is inside or outside the vehicle based on a correlation of location information of the UE and the relay device. Some techniques determine whether the UE is inside or outside the vehicle based on ranging procedures over a sidelink channel. Some techniques determine whether the UE is inside or outside the vehicle based on an application level pairing and prompting a user to confirm whether the user has entered the vehicle. Some techniques determine whether the UE is inside or outside the vehicle based on an application (e.g., a ride sharing application), considering a starting location and a destination location.

A method for wireless communications at a UE is described. The method may include receiving a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle, generating a first set of multiple SS/PBCH block measurements for the set of multiple SS/PBCH block resources, and performing a first cell selection procedure to associate with a cell of the relay device based on a first SS/PBCH block measurement of the first set of multiple SS/PBCH block measurements corresponding to the first antenna satisfying a threshold.

An apparatus for wireless communications at a UE is described. The apparatus may include a processor, memory in electronic communication with the processor, and instructions stored in the memory. The instructions may be executable by the processor to cause the apparatus to receive a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle, generate a first set of multiple SS/PBCH block measurements for the set of multiple SS/PBCH block resources, and perform a first cell selection procedure to associate with a cell of the relay device based on a first SS/PBCH block measurement of the first set of multiple SS/PBCH block measurements corresponding to the first antenna satisfying a threshold.

Another apparatus for wireless communications at a UE is described. The apparatus may include means for receiving a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle, means for generating a first set of multiple SS/PBCH block measurements for the set of multiple SS/PBCH block resources, and means for performing a first cell selection procedure to associate with a cell of the relay device based on a first SS/PBCH block measurement of the first set of multiple SS/PBCH block measurements corresponding to the first antenna satisfying a threshold.

A non-transitory computer-readable medium storing code for wireless communications at a UE is described. The code may include instructions executable by a processor to receive a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle, generate a first set of multiple SS/PBCH block measurements for the set of multiple SS/PBCH block resources, and perform a first cell selection procedure to associate with a cell of the relay device based on a first SS/PBCH block measurement of the first set of multiple SS/PBCH block measurements corresponding to the first antenna satisfying a threshold.

Some examples of the method, apparatuses, and non-transitory computer-readable medium described herein may further include operations, features, means, or instructions for generating a second set of multiple SS/PBCH block measurements and performing a second cell selection procedure based on a second SS/PBCH block measurement of the second set of multiple SS/PBCH block measurements corresponding to the first antenna failing to satisfy the threshold.

Some examples of the method, apparatuses, and non-transitory computer-readable medium described herein may further include operations, features, means, or instructions for generating a second set of multiple SS/PBCH block measurements and transmitting a measurement report indicating a second SS/PBCH block measurement of the second set of multiple SS/PBCH block measurements.

Some examples of the method, apparatuses, and non-transitory computer-readable medium described herein may further include operations, features, means, or instructions for receiving a configuration message instructing the UE to perform a handover procedure to establish a primary link with the cell of the relay device based on the second SS/PBCH block measurement satisfying the threshold and establishing the primary link with the cell of the relay device based on the configuration message.

Some examples of the method, apparatuses, and non-transitory computer-readable medium described herein may further include operations, features, means, or instructions for receiving a configuration message instructing the UE to establish a secondary link with the cell of the relay device based on the second SS/PBCH block measurement not satisfying the threshold and establishing the secondary link with the cell of the relay device based on the configuration message.

Some examples of the method, apparatuses, and non-transitory computer-readable medium described herein may further include operations, features, means, or instructions for generating a second set of multiple SS/PBCH block measurements and refraining from performing a second cell selection procedure based on a second SS/PBCH block measurement of the second set of multiple SS/PBCH block measurements corresponding to the first antenna satisfying the threshold.

Some examples of the method, apparatuses, and non-transitory computer-readable medium described herein may further include operations, features, means, or instructions for determining that the UE may be inside the vehicle based at last in part on the first SS/PBCH block measurement measured by the UE for the first antenna exceeding the threshold.

Some examples of the method, apparatuses, and non-transitory computer-readable medium described herein may further include operations, features, means, or instructions for determining that the UE may be inside the vehicle based at last in part on a difference between the first SS/PBCH block measurement measured by the UE for the first antenna and at least one other SS/PBCH block measurement of the first set of multiple SS/PBCH block measurements exceeding a second threshold.

In some examples of the method, apparatuses, and non-transitory computer-readable medium described herein, the at least one other SS/PBCH block measurement correspond to one or more antennas of the relay device positioned on an exterior of the vehicle.

In some examples of the method, apparatuses, and non-transitory computer-readable medium described herein, the first SS/PBCH block measurement may be a reference signal received power measurement.

A method for wireless communications at a base station is described. The method may include transmitting, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle, transmitting control signaling configuring the relay device to transmit a set of multiple SS/PBCH blocks using the set of multiple SS/PBCH block resources via a set of multiple antennas including at least the first antenna in accordance with the control message, receiving a first measurement report from the UE indicating a first SS/PBCH block measurement corresponding to the first antenna satisfies a threshold, and transmitting a configuration message instructing the UE to perform a handover procedure from the base station to the relay based on the first SS/PBCH block measurement.

An apparatus for wireless communications at a base station is described. The apparatus may include a processor, memory in electronic communication with the processor, and instructions stored in the memory. The instructions may be executable by the processor to cause the apparatus to transmit, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle, transmit control signaling configuring the relay device to transmit a set of multiple SS/PBCH blocks using the set of multiple SS/PBCH block resources via a set of multiple antennas including at least the first antenna in accordance with the control message, receive a first measurement report from the UE indicating a first SS/PBCH block measurement corresponding to the first antenna satisfies a threshold, and transmit a configuration message instructing the UE to perform a handover procedure from the base station to the relay based on the first SS/PBCH block measurement.

Another apparatus for wireless communications at a base station is described. The apparatus may include means for transmitting, to a UE, a control message indicating a set of multiple synchronization signal and physical broadcast channel (SS/PBCH) block indexes corresponding to a set of multiple SS/PBCH block resources, the control message indicating that a first index of the set of multiple indexes is associated with a first antenna of a relay device positioned on an interior of a vehicle, means for transmitting control signaling configuring the relay device to transmit a set of multiple SS/PBCH blocks using the set of multiple SS/PBCH block resources via a set of multiple antennas including at least the first antenna in accordance with the control message, means for receiving a first measurement report from the UE indicating a first SS/PBCH block measurement corresponding to the first antenna satisfies a threshold, and means for transmitting a configuration message instructing the UE to perform a handover procedure from the base station to the relay based on the first SS/PBCH block measurement.

A non-transitory computer-readable medium storing code for wireless communications at a base station is described. The code may include instructions executable by a processor to transmit, to a UE, a control message indicating a set of multiple synchronization signal and physical broadcast channel (SS/PBCH) block indexes corresponding to a set of multiple SS/PBCH block resources, the control message indicating that a first index of the set of multiple indexes is associated with a first antenna of a relay device positioned on an interior of a vehicle, transmit control signaling configuring the relay device to transmit a set of multiple SS/PBCH blocks using the set of multiple SS/PBCH block resources via a set of multiple antennas including at least the first antenna in accordance with the control message, receive a first measurement report from the UE indicating a first SS/PBCH block measurement corresponding to the first antenna satisfies a threshold, and transmit a configuration message instructing the UE to perform a handover procedure from the base station to the relay based on the first SS/PBCH block measurement.

Some examples of the method, apparatuses, and non-transitory computer-readable medium described herein may further include operations, features, means, or instructions for receiving a second measurement report from the UE indicating a second SS/PBCH block measurement corresponding to the first antenna fails to satisfy the threshold.

Some examples of the method, apparatuses, and non-transitory computer-readable medium described herein may further include operations, features, means, or instructions for configuring the UE to perform a handover from the relay device to the base station based on the second measurement report.

Some examples of the method, apparatuses, and non-transitory computer-readable medium described herein may further include operations, features, means, or instructions for transmitting a second configuration message instructing the UE to establish a secondary link with the relay device based on the second SS/PBCH block measurement failing to satisfy the threshold.

Some examples of the method, apparatuses, and non-transitory computer-readable medium described herein may further include operations, features, means, or instructions for receiving a second measurement report from the UE indicating a second SS/PBCH block measurement corresponding to the first antenna satisfies the threshold and refraining from configuring a handover procedure for the UE based on the second SS/PBCH block measurement.

Some examples of the method, apparatuses, and non-transitory computer-readable medium described herein may further include operations, features, means, or instructions for determining that the UE may be inside the vehicle based at last in part on the first SS/PBCH block measurement corresponding to the first antenna exceeding the threshold.

Some examples of the method, apparatuses, and non-transitory computer-readable medium described herein may further include operations, features, means, or instructions for receiving a second measurement report from the UE indicating a second SS/PBCH block measurement corresponding to a second antenna of the relay device that may be positioned on an exterior of the vehicle and determining that the UE may be inside the vehicle based at last in part on a difference between the first SS/PBCH block measurement for the first antenna and the second SS/PBCH block measurement for the second antenna exceeding a second threshold.

In some examples of the method, apparatuses, and non-transitory computer-readable medium described herein, the first SS/PBCH block measurement may be a reference signal received power measurement.

A method for wireless communications at a UE is described. The method may include receiving a control message configuring the UE to monitor for location reporting messaging from a relay device positioned on a vehicle, receiving at least one location reporting message from the relay device indicating first positioning information of the relay device, generating a second positioning information of the UE, and performing a first cell selection procedure to associate with a cell of the relay device based on a correlation between the first positioning information of the relay device and the second positioning information of the UE satisfying a threshold.

An apparatus for wireless communications at a UE is described. The apparatus may include a processor, memory in electronic communication with the processor, and instructions stored in the memory. The instructions may be executable by the processor to cause the apparatus to receive a control message configuring the UE to monitor for location reporting messaging from a relay device positioned on a vehicle, receive at least one location reporting message from the relay device indicating first positioning information of the relay device, generate a second positioning information of the UE, and perform a first cell selection procedure to associate with a cell of the relay device based on a correlation between the first positioning information of the relay device and the second positioning information of the UE satisfying a threshold.

Another apparatus for wireless communications at a UE is described. The apparatus may include means for receiving a control message configuring the UE to monitor for location reporting messaging from a relay device positioned on a vehicle, means for receiving at least one location reporting message from the relay device indicating first positioning information of the relay device, means for generating a second positioning information of the UE, and means for performing a first cell selection procedure to associate with a cell of the relay device based on a correlation between the first positioning information of the relay device and the second positioning information of the UE satisfying a threshold.

A non-transitory computer-readable medium storing code for wireless communications at a UE is described. The code may include instructions executable by a processor to receive a control message configuring the UE to monitor for location reporting messaging from a relay device positioned on a vehicle, receive at least one location reporting message from the relay device indicating first positioning information of the relay device, generate a second positioning information of the UE, and perform a first cell selection procedure to associate with a cell of the relay device based on a correlation between the first positioning information of the relay device and the second positioning information of the UE satisfying a threshold.

Some examples of the method, apparatuses, and non-transitory computer-readable medium described herein may further include operations, features, means, or instructions for transmitting a UE location report indicating the first positioning information or the second positioning information, or both.

Some examples of the method, apparatuses, and non-transitory computer-readable medium described herein may further include operations, features, means, or instructions for receiving a configuration message instructing the UE to establish a primary link or a secondary link with the relay device based on the UE location report.

Some examples of the method, apparatuses, and non-transitory computer-readable medium described herein may further include operations, features, means, or instructions for receive a second location reporting message from the relay device including a third positioning information for the relay device, generating a fourth positioning information of the UE, and performing a second cell selection procedure based on a second correlation between the first positioning information of the relay device and the fourth positioning information of the UE failing to satisfy the threshold.

Some examples of the method, apparatuses, and non-transitory computer-readable medium described herein may further include operations, features, means, or instructions for determining that the UE may be outside of the vehicle based on the correlation between the third positioning information of the relay device and the fourth positioning information of the UE not satisfying the threshold.

Some examples of the method, apparatuses, and non-transitory computer-readable medium described herein may further include operations, features, means, or instructions for receiving a second location reporting message from the relay device including a third positioning information for the relay device, generating a fourth positioning information of the UE, and refraining from performing a second cell selection procedure based on a second correlation between the first positioning information of the relay device and the fourth positioning information of the UE satisfying the threshold.

Some examples of the method, apparatuses, and non-transitory computer-readable medium described herein may further include operations, features, means, or instructions for determining that the UE may be inside the vehicle based on the correlation between the first positioning information of the relay device and the second positioning information of the UE satisfying the threshold.

In some examples of the method, apparatuses, and non-transitory computer-readable medium described herein, the first positioning information and the second positioning information may be based on geolocation information, heading, direction, speed, or any combination thereof.

In some examples of the method, apparatuses, and non-transitory computer-readable medium described herein, the correlation may be based on a commonality between the first positioning information and the second positioning information for at least a threshold interval of time.

A method for wireless communications at a base station is described. The method may include transmitting, to a UE, a control message configuring the UE to transmit a location reporting messaging, receiving at least one location reporting message indicating a first positioning information of a relay device on a vehicle and a second positioning information of the UE, and transmitting a configuration message instructing the UE to perform a handover procedure from the base station to the relay based on a correlation between the first positioning information of the relay device and the second positioning information of the UE satisfying a threshold.

An apparatus for wireless communications at a base station is described. The apparatus may include a processor, memory in electronic communication with the processor, and instructions stored in the memory. The instructions may be executable by the processor to cause the apparatus to transmit, to a UE, a control message configuring the UE to transmit a location reporting messaging, receive at least one location reporting message indicating a first positioning information of a relay device on a vehicle and a second positioning information of the UE, and transmit a configuration message instructing the UE to perform a handover procedure from the base station to the relay based on a correlation between the first positioning information of the relay device and the second positioning information of the UE satisfying a threshold.

Another apparatus for wireless communications at a base station is described. The apparatus may include means for transmitting, to a UE, a control message configuring the UE to transmit a location reporting messaging, means for receiving at least one location reporting message indicating a first positioning information of a relay device on a vehicle and a second positioning information of the UE, and means for transmitting a configuration message instructing the UE to perform a handover procedure from the base station to the relay based on a correlation between the first positioning information of the relay device and the second positioning information of the UE satisfying a threshold.

A non-transitory computer-readable medium storing code for wireless communications at a base station is described. The code may include instructions executable by a processor to transmit, to a UE, a control message configuring the UE to transmit a location reporting messaging, receive at least one location reporting message indicating a first positioning information of a relay device on a vehicle and a second positioning information of the UE, and transmit a configuration message instructing the UE to perform a handover procedure from the base station to the relay based on a correlation between the first positioning information of the relay device and the second positioning information of the UE satisfying a threshold.

Some examples of the method, apparatuses, and non-transitory computer-readable medium described herein may further include operations, features, means, or instructions for receiving the at least one location reporting message from the UE indicating the first positioning information or the second positioning information, or both.

Some examples of the method, apparatuses, and non-transitory computer-readable medium described herein may further include operations, features, means, or instructions for transmitting a second configuration message instructing the UE to establish a primary link or a secondary link with the relay device based on the at least one location reporting message.

Some examples of the method, apparatuses, and non-transitory computer-readable medium described herein may further include operations, features, means, or instructions for receive at least a second location reporting message including a third positioning information for the UE and a fourth positioning information of the relay device and configuring a handover procedure for the UE from the relay device to the base station based on a second correlation between the first positioning information of the relay device and the fourth positioning information of the UE failing to satisfy the threshold.

Some examples of the method, apparatuses, and non-transitory computer-readable medium described herein may further include operations, features, means, or instructions for determining that the UE may be outside of the vehicle based on the correlation between the third positioning information of the relay device and the fourth positioning information of the UE not satisfying the threshold.

Some examples of the method, apparatuses, and non-transitory computer-readable medium described herein may further include operations, features, means, or instructions for receiving at least a second location reporting message including a third positioning information for the UE and a fourth positioning information of the relay device and refraining from configuring a handover procedure for the UE based on a second correlation between the first positioning information of the relay device and the fourth positioning information of the UE satisfying the threshold.

Some examples of the method, apparatuses, and non-transitory computer-readable medium described herein may further include operations, features, means, or instructions for determining that the UE may be inside the vehicle based on the correlation between the first positioning information of the relay device and the second positioning information of the UE satisfying the threshold.

In some examples of the method, apparatuses, and non-transitory computer-readable medium described herein, the first positioning information and the second positioning information may be based on geolocation information, heading, direction, speed, or any combination thereof.

In some examples of the method, apparatuses, and non-transitory computer-readable medium described herein, the correlation may be based on a commonality between the first positioning information and the second positioning information for at least a threshold interval of time.

DETAILED DESCRIPTION

Figure 1:
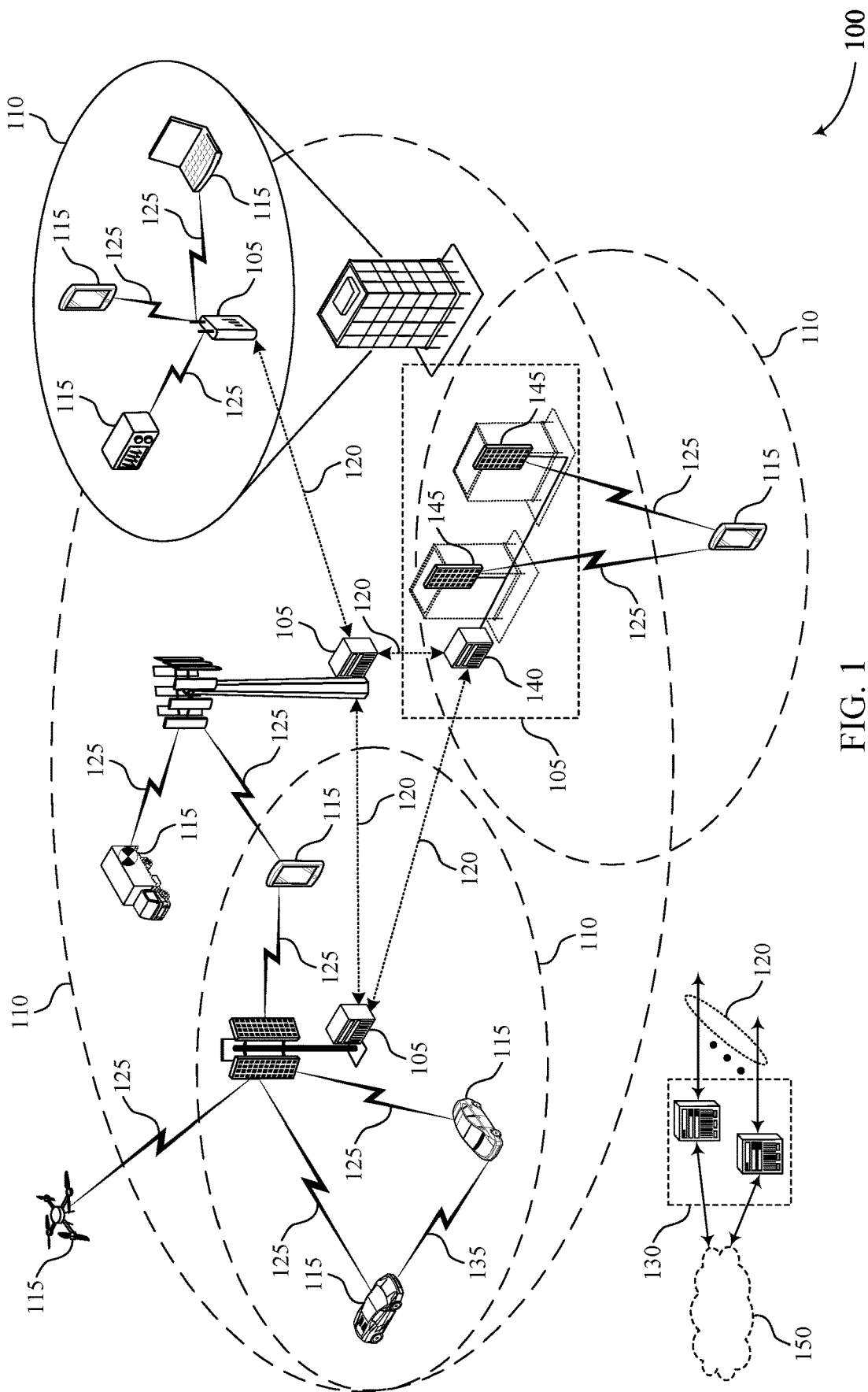
FIG. 1 illustrates an example of a wireless communications system that supports techniques for efficient mobility using relay devices in accordance with aspects of the present disclosure.

Some wireless communications systems may utilize relay devices to improve coverage and capacity. For example, a wireless communications system may equip vehicles with relay devices to provide additional coverage for neighboring user equipments (UEs). The relay devices may be mounted on vehicles and may provide a connection to a wireless network for the neighboring UEs, which may be in the vehicle or in proximity to the vehicle. The relay devices may establish wireless connections with stationary base stations, or donor base stations, to connect to a macro network.

Techniques described herein support enhanced connection for a UE via a relay device based on whether the UE is inside or outside a vehicle equipped with the relay device. For example, a UE may be in a vicinity of a relay device. If the UE is inside the vehicle, coverage may be better from relay device than a macro base station. The UE or the network, or both, may implement techniques to determine if the UE is inside or outside the vehicle equipped with the relay device. In some cases, the UE may determine if the UE is inside the vehicle or is outside the vehicle (e.g., has exited the vehicle) for idle mode camping. The network (e.g., the base station or the relay device, or both) may determine whether the UE is inside the vehicle or outside the vehicle (e.g., has exited the vehicle) for connected mode mobility.

If a UE is operating in an idle mode, the UE may be biased toward camping on, or associating with, a relay device for as long as the UE is inside a vehicle with the relay device. In some cases, the network may manage mobility for a UE operating in a connected mode. If the network determines that the UE is inside the vehicle, the network may hand the UE over to the relay device mounted on the vehicle. For example, a cell of the relay device may become the primary link for the UE while the UE is in the vehicle. The network may refrain from configuring handovers for the UE while the UE is in the vehicle. If the network determines that the UE in the connected mode has exited the vehicle, the network may hand the UE over to a base station. In some cases, the UE may maintain a connection with the cell of the relay device as a secondary link. In some cases, the network may determine that the UE is outside the vehicle. If the UE is outside the vehicle, the relay device may be configured as a secondary link for the UE, but the network may not hand the UE over from the base station to the relay device.

Techniques for determining whether the UE is inside the vehicle or outside the vehicle are described herein. In a first example, the UE may measure synchronization signal block (SSBs) or synchronization signal/physical broadcast channel (SS/PBCH) blocks from antennas of the relay device, including at least one antenna inside the vehicle. If an SSB measurement corresponding to the inside antenna exceeds a threshold, the UE may be determined to be inside the vehicle. In some examples, the UE may determine whether the UE is inside or outside the vehicle for idle mode camping. If the UE is in a connected mode, the UE may send a measurement report to the base station including the SSB measurements, and the network may manage connected mode mobility for the UE based on whether the UE is inside or outside the vehicle.

In a second example, the UE or network, or both, may determine whether the UE is inside or outside the vehicle based on correlation of location reports of the relay device and the UE. In some cases, the relay device may broadcast location reports, and the UE may compare location information of the relay device to location information of the UE. If the location information of the relay and the UE correlate, the UE may determine that the UE is inside the vehicle. If the location information for the devices are different or diverge, the UE may determine that the UE is outside the vehicle or has exited the vehicle. The UE, when operating in an idle mode, may determine whether to camp on a cell of the relay device based on the correlation and whether the UE is inside or outside the vehicle. In some cases, a base station may receive location information for the UE and the relay device, and the base station may determine whether the UE is inside or outside the vehicle based on a correlation of the location information. Some additional techniques for determining whether the UE is inside the vehicle or outside the vehicle are described herein.

Aspects of the disclosure are initially described in the context of wireless communications systems. Aspects of the disclosure are further illustrated by and described with reference to apparatus diagrams, system diagrams, and flowcharts that relate to techniques for efficient mobility using relay devices.

FIG. 1 illustrates an example of a wireless communications system 100 that supports techniques for efficient mobility using relay devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support techniques for enhanced idle mode camping and enhanced connected mode mobility based on whether a UE 115 is inside or outside a vehicle equipped with a relay device. For example, a UE 115 may be in a vicinity of a relay device which is attached to a vehicle. The UE 115 or a base station 105, or both, may implement techniques to determine if the UE 115 is inside or outside the vehicle equipped with the relay device. In some cases, the UE 115 may determine if the UE 115 is inside the vehicle or is outside the vehicle (e.g., has exited the vehicle) for idle mode camping. The network (e.g., the base station 105 or the relay device, or both) may determine whether the UE 115 is inside the vehicle or outside the vehicle (e.g., has exited the vehicle) for connected mode mobility.

If a UE 115 is operating in an idle mode, the UE 115 may be biased toward camping on, or associating with, a relay device for as long as the UE 115 is inside a vehicle with the relay device. In some cases, the network may manage mobility for a UE 115 operating in a connected mode. If the network determines that the UE 115 is inside the vehicle, the network may hand the UE 115 over to the relay device mounted on the vehicle. If the network determines that the UE 115 in the connected mode has exited the vehicle, the network may hand the UE 115 over to a base station 105. In some cases, the network may determine that the UE 115 is outside the vehicle. If the UE 115 is outside the vehicle, the relay device may be configured as a secondary link for the UE 115, but the network may not hand the UE 115 over from the base station 105 to the relay device.

Techniques for determining whether a UE 115 is inside a vehicle with a relay device are described herein. Some techniques determine whether the UE is inside or outside the vehicle based on SS/PBCH block measurements for different antennas of the relay device. Some techniques determine whether the UE 115 is inside or outside the vehicle based on a correlation of location information of the UE 115 and the relay device. Some techniques determine whether the UE 115 is inside or outside the vehicle based on ranging procedures over a sidelink channel. Some techniques determine whether the UE 115 is inside or outside the vehicle based on an application level pairing and prompting a user to confirm whether the user has entered the vehicle. Some techniques determine whether the UE 115 is inside or outside the vehicle based on an application (e.g., a ride sharing application), considering a starting location and a destination location.

Figure 2:
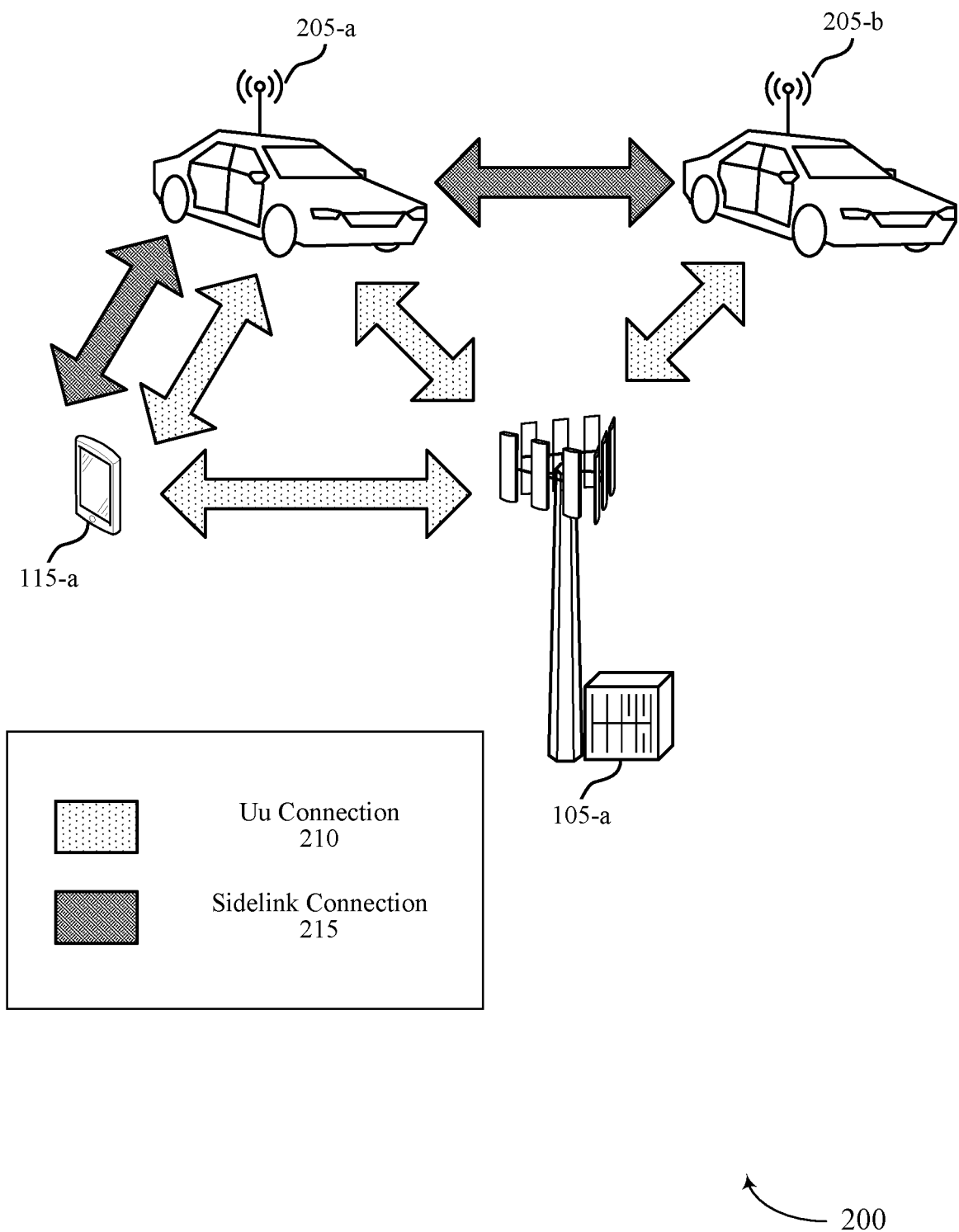
FIG. 2 illustrates an example of a wireless communications system that supports techniques for efficient mobility using relay devices in accordance with aspects of the present disclosure.

FIG. 2 illustrates an example of a wireless communications system 200 that supports techniques for efficient mobility using relay devices in accordance with aspects of the present disclosure.

The wireless communications system may include one or more UEs 115, one or more vehicles, and one or more base stations 105. UE 115-*a* may be an example of a UE 115 as described with reference to FIG. 1 and base station 105-*a* may be an example of a base station 105 as described with reference to FIG. 1. A relay device 205 may be include aspects of a UE 115 or a base station 105. In some cases, a vehicle may be equipped with a relay device 205. The relay device 205 may operate as a relay between UE 115-*a* and a macro network or core network, or between UE 115-*a* and a base station 105, such base station 105-*a*.

Relay device 205-*a* may have a first air interface established with base station 105-*a*, such as for a Uu connection 210. The first air interface may provide a radio interface between relay device 205-*a* and a wireless communications network of base station 105-*a* (e.g., LTE, NR, etc.). Relay device 205-*a* and relay device 205-*b* may have a second air interface established with each other. For example, relay device 205-*a* and relay device 205-*b* may communicate over a sidelink connection 215, such as via a PC5 interface. UE 115-*a* may communicate with relay device 205-*a* using the first air interface, the second air interface, or both. For example, relay device 205-*a* may provide a Uu connection 210 to the wireless network. In some cases, UE 115-*a* may communicate with relay device 205-*a* or the vehicle affixed with relay device 205-*a*, or both, over a sidelink connection 215. In some examples, UE 115-*a* may have a Uu connection 210 established with base station 105-*a*.

In some examples, the wireless communications system 200 may be implemented in a high population density area. The wireless communications system 200 may implement techniques to improve coverage or extend capacity for UEs 115 in the wireless communications system 200, such as by implementing relay devices. Relay devices may be mounted on vehicles and may provide a connection to a wireless network for neighboring UEs 115, which may be in the vehicle or in proximity to the vehicle. Some vehicles may travel along fixed paths, such as buses, trains, or trams. Other vehicles may travel along variable paths, such as taxis or end-user cars. The relay devices 205 may establish wireless connections with stationary base stations 105, or donor base stations 105, to connect to a macro network (e.g., providing LTE communications, NR communications, or both). In some cases, the wireless communications system 200 may implement aspects of a fleet networking system by utilizing the relay devices mounted on vehicles.

Techniques described herein support enhanced connection for a UE 115 via a relay device 205 based on whether the UE 115 is inside or outside a vehicle equipped with the relay device 205. For example, UE 115-*a* may be in a vicinity of relay device 205-*a*. If UE 115-*a* is inside the vehicle, coverage may be better from relay device 205-*a* than a macro base station 105, such as base station 105-*a*. UE 115-*a* or base station 105-*a*, or both, may implement techniques to determine if UE 115-*a* is inside or outside the vehicle equipped with relay device 205-*a*. In some cases, UE 115-*a* may determine if UE 115-*a* is inside the vehicle or is outside the vehicle (e.g., has exited the vehicle) for idle mode camping. The network (e.g., base station 105-*a*, relay device 205-*a*, or both) may determine whether UE 115-*a* is inside the vehicle or outside the vehicle (e.g., has exited the vehicle) for connected mode mobility.

If UE 115-*a* is operating in an idle mode, UE 115-*a* may be biased toward camping on relay device 205-*a* for as long as UE 115-*a* is inside the vehicle. If UE 115-*a* is inside the vehicle, UE 115-*a* may determine whether to associate with, or camp on, relay device 205-*a*. In some cases, UE 115-*a* may detect a data communication, and UE 115-*a* may switch to a connected mode and connect to relay device 205-*a* to establish a service.

In some cases, the network may manage mobility for UE 115-*a* operating in a connected mode. If the network determines that UE 115-*a* is inside the vehicle, the network may hand UE 115-*a* over to relay device 205-*a*. In some cases, the network may transmit an RRC configuration message to UE 115-*a* via a macro base station 105 to hand UE 115-*a* over to relay device 205-*a*. For example, relay device 205-*a* may become the primary link for UE 115-*a* while UE 115-*a* is in the vehicle. The network may keep UE 115-*a* on relay device 205-*a* for as long as UE 115-*a* is inside the vehicle.

If the network subsequently determines that UE 115-*a* in the connected mode has exited the vehicle, the network may hand UE 115-*a* to a macro cell. In some cases, UE 115-*a* may maintain a connection with relay device 205-*a* as a secondary link. In some cases, the network may transmit an RRC reconfiguration message to UE 115-*a*, such as via relay device 205-*a*, to configure UE 115-*a* with the connection to the macro cell.

In some cases, UE 115-*a* may be operating in the connected mode, and the network may determine that UE 115-*a* is outside the vehicle. In some cases, relay device 205-*a* may be configured as a secondary link for UE 115-*a*, but the network may not hand UE 115-*a* over to relay device 205-*a* as a primary link.

In some cases, these techniques may ensure a more robust connection for UE 115-*a*. In some cases, UE 115-*a* make connection decisions based on (e.g., based solely on) signal strength, but UE 115-*a* may in some cases be unable to differentiate between being in close proximity to the vehicle and being in the vehicle. Therefore, UE 115-*a* may additionally, or alternatively, implement these techniques to further determine whether UE 115-*a* is inside or outside the vehicle. One or more of the following techniques may be utilized to determine whether UE 115-*a* is inside or outside of the vehicle.

In a first example, relay device 205-*a* may have multiple antennas. At least a first antenna may be inside the vehicle, and one or more antennas may be outside of the vehicle. The network, through a macro base station 105 or relay device 205-*a*, may indicate to UE 115-*a* whether a specific beam comes from the first antenna inside the vehicle or from an outside antenna. In some cases, a macro base station 105 or relay device 205-*a* may send a control message indicating multiple SSBs and multiple indexes corresponding to the multiple SSBs. Relay device 205-*a* may transmit an SSB from each antenna.

UE 115-*a* may generate a set of SSB measurements for the SSBs. For example, UE 115-*a* may measure the SSBs transmitted by the inside antenna and the outside antennas. In some cases, UE 115-*a* may perform a reference signal received power (RSRP) measurement on the SSBs. UE 115-*a* may determine that UE 115-*a* is in the vehicle based on an SSB measurement associated with the first (e.g., interior) antenna being above a threshold. Additionally, or alternatively, UE 115-*a* may determine UE 115-*a* is inside the vehicle if a signal strength measured by UE 115-*a* for the inside antenna is above the signal strength measured by UE 115-*a* for the outside antennas by a certain threshold. For example, the inside antenna may have a higher signal strength than the outside antennas, and UE 115-*a* may determine that UE 115-*a* is inside the vehicle based on the higher signal strength.

In some cases of the first example, UE 115-*a* may be operating in a connected mode. UE 115-*a* may have a connection established with a macro base station 105, such as base station 105-*a*. In some examples, UE 115-*a* may not have a primary connection established with relay device 205-*a*. UE 115-*a* may transmit measurement reports for the SSBs to the network, such as through base station 105-*a* or relay device 205-*a*. In some cases, the network may configure UE 115-*a* to transmit the measurement reports for the SSBs. If the network determines that UE 115-*a* is inside the vehicle with relay device 205-*a*, the network may hand UE 115-*a* over to relay device 205-*a*.

The network may similarly determine if UE 115-*a* is inside or outside the vehicle by comparing the SSB measurements to thresholds. For example, if the SSB measurement for the interior antenna is above a threshold, or an SSB measurement between an interior antenna and an exterior antenna is above a threshold, the network may determine that UE 115-*a* is inside the vehicle. Otherwise, the network may determine that UE 115-*a* is outside the vehicle. If measurements switch from indicating that UE 115-*a* is inside the vehicle to outside the vehicle, the network may determine that UE 115-*a* has exited the vehicle. If the network determines UE 115-*a* is outside the vehicle, or has exited the vehicle, the network may configure UE 115-*a* to connect to a macro base station 105, such as base station 105-*a*. In some cases, once UE 115-*a* has exited the vehicle, UE 115-*a* may add relay device 205-*a* as a secondary link (e.g., instead of a primary link), such as using dual connectivity or carrier aggregation.

In a second example, UE 115-*a* or the network, or both, may determine whether UE 115-*a* is inside the vehicle based on positioning information. For example, if positioning information for UE 115-*a* correlate to positioning information for a relay device, it may be an indicator that UE 115-*a* is inside a vehicle with the relay device. In some examples, UE 115-*a* may be operating in an idle mode. UE 115-*a* may receive location reports from relay device 205-*a* indicating positioning information for relay device 205-*a*. In some cases, relay device 205-*a* may periodically transmit location reports, which may carry updated information for the movements of the vehicle. In some examples, a location report may be broadcast, such as over a sidelink interface. UE 115-*a* may also determine its own positioning information.

UE 115-*a*, operating in the idle mode, may determine whether UE 115-*a* is inside or outside the vehicle based on a correlation of the location information for UE 115-*a* and relay device 205-*a*. If location reports for UE 115-*a* correlate to location reports for relay device 205-*a*, then UE 115-*a* may determine that UE 115-*a* is inside the vehicle. For example, if location information for UE 115-*a* and relay device 205-*a* have similar geolocation information, speed, direction, heading, or any combination thereof, for a threshold interval of time (e.g., a certain number of seconds), UE 115-*a* may determine that UE 115-*a* is inside the vehicle equipped with relay device 205-*a*. For example, the correlation may be a determination of whether a difference between one or more of a geolocation information, speed, direction, heading of UE 115-*a* relative to relay device 205-*a* satisfies a threshold at a current time or over a time interval.

UE 115-*a* may be considered to be inside of a vehicle equipped with relay device 205-*a* if a difference between one or more of a geolocation information, speed, direction, heading of UE 115-*a* relative to relay device 205-*a* satisfies a threshold (e.g., is less than a threshold) at a current time or over a time interval. The UE 115-*a* may be considered to be outside of a vehicle equipped with relay device 205-*a* if a difference between one or more of a geolocation information, speed, direction, heading of UE 115-*a* relative to relay device 205-*a* does not satisfy a threshold (e.g., is greater than a threshold at a current time or over a time interval).

If the location reports for UE 115-*a* and relay device 205-*a* are not correlated, or indicate a difference or divergence in geolocation information, speed, direction, heading, or any combination thereof, UE 115-*a* may determine it is outside of the vehicle equipped with relay device 205-*a*. If the positioning information correlate, then diverge, UE 115-*a* may determine it has exited the vehicle.

In some cases, UE 115-*a* may operate in a connected mode, and the network may determine whether UE 115-*a* is inside or outside of the vehicle. UE 115-*a* may generate location reports and transmit the location reports to the network. In some cases, UE 115-*a* may transmit the location reports to a macro base station 105, or UE 115-*a* may send the location reports to relay device 205-*a*. In some examples, relay device 205-*a* may also send location reports including location information for relay device 205-*a* to the network. If location reports for UE 115-*a* correlate to location reports for relay device 205-*a*, the network may determine that UE 115-*a* is inside the vehicle. If the location reports for UE 115-*a* and relay device 205-*a* are not correlated, or indicate a difference or divergence in location information, the network may determine UE 115-*a* is outside of the vehicle equipped with relay device 205-*a*. If the positioning information correlate, then diverge, the network may determine UE 115-*a* has exited the vehicle In a third example, UE 115-*a* or relay device 205-*a*, or both, may determine whether UE 115-*a* is inside the vehicle based on a proximity between UE 115-*a* and relay device 205-*a*. For example, UE 115-*a* or relay device 205-*a* may determine whether UE 115-*a* is inside the vehicle based on ranging of relay device 205-*a* over a sidelink connection 215. UE 115-*a* may determine that UE 115-*a* is inside or outside the vehicle based on ranging of relay device 205-*a* over a sidelink connection 215. In some cases, the network may determine if UE 115-*a* is inside or outside the vehicle based on measurement reports indicating the range from UE 115-*a*, relay device 205-*a*, or both. If a distance between UE 115-*a* and relay device 205-*a* is within a certain range (e.g., within one meter) for a threshold amount of time, UE 115-*a* may be determined to be inside the vehicle. In some cases, the ranging may be determined based on signal propagation delay, a round trip time, or a round trip delay over the sidelink connection 215.

In a fourth example, UE 115-*a* or the network, or both, may determine whether UE 115-*a* is inside or outside of the vehicle based on an application level pairing. For example, upon entering the vehicle, UE 115-*a* may receive a notification (e.g., via the sidelink connection 215 or a Bluetooth connection) passed on to upper layers. UE 115-*a* may display a notification to a user operating UE 115-*a* and prompt the user for confirmation that the user is inside the vehicle. In some cases, if the user confirms, the upper layers of UE 115-*a* may notify a modem of UE 115-*a* that UE 115-*a* is inside the vehicle. In some cases, if the user confirms, UE 115-*a* may report to relay device 205-*a* or a macro base station 105, or both, that UE 115-*a* is inside the vehicle with a relay identifier corresponding to relay device 205-*a*. In some examples, the user may be prompted with an option to subscribe to a service to connect to relay device 205-*a*. In some cases, the upper layers of UE 115-*a* may report to the modem of UE 115-*a* that UE 115-*a* is inside the vehicle if the user subscribes. In some cases, UE 115-*a* may report to relay device 205-*a* or the macro base station 105, or both, that UE 115-*a* is inside the vehicle if the user subscribes. Similarly, the user may be given an option or prompt on the display of UE 115-*a* to indicate when the user is leaving the vehicle. The upper layers at UE 115-*a* may then notify the modem of UE 115-*a*. UE 115-*a* may then send a measurement report to a macro base station 105 to indicate that UE 115-*a* has exited the vehicle.

In a fifth example, a set of vehicles may be equipped with relay devices. For example, the set of vehicles may operate as a ride sharing fleet of vehicles. A ride sharing application at UE 115-*a* may notify a modem of UE 115-*a* when a user of UE 115-*a* has been picked up. In some examples, UE 115-*a* may report to a macro base station 105 that UE 115-*a* is inside a vehicle with a relay identifier corresponding to relay device 205-*a*. Similarly, the ride sharing application may notify the modem of UE 115-*a* when the user has arrived at the destination. In some cases, UE 115-*a* may operate in the connected mode, and UE 115-*a* may notify a macro base station 105 that the user has arrived at the destination via a measurement report.

Figure 3:
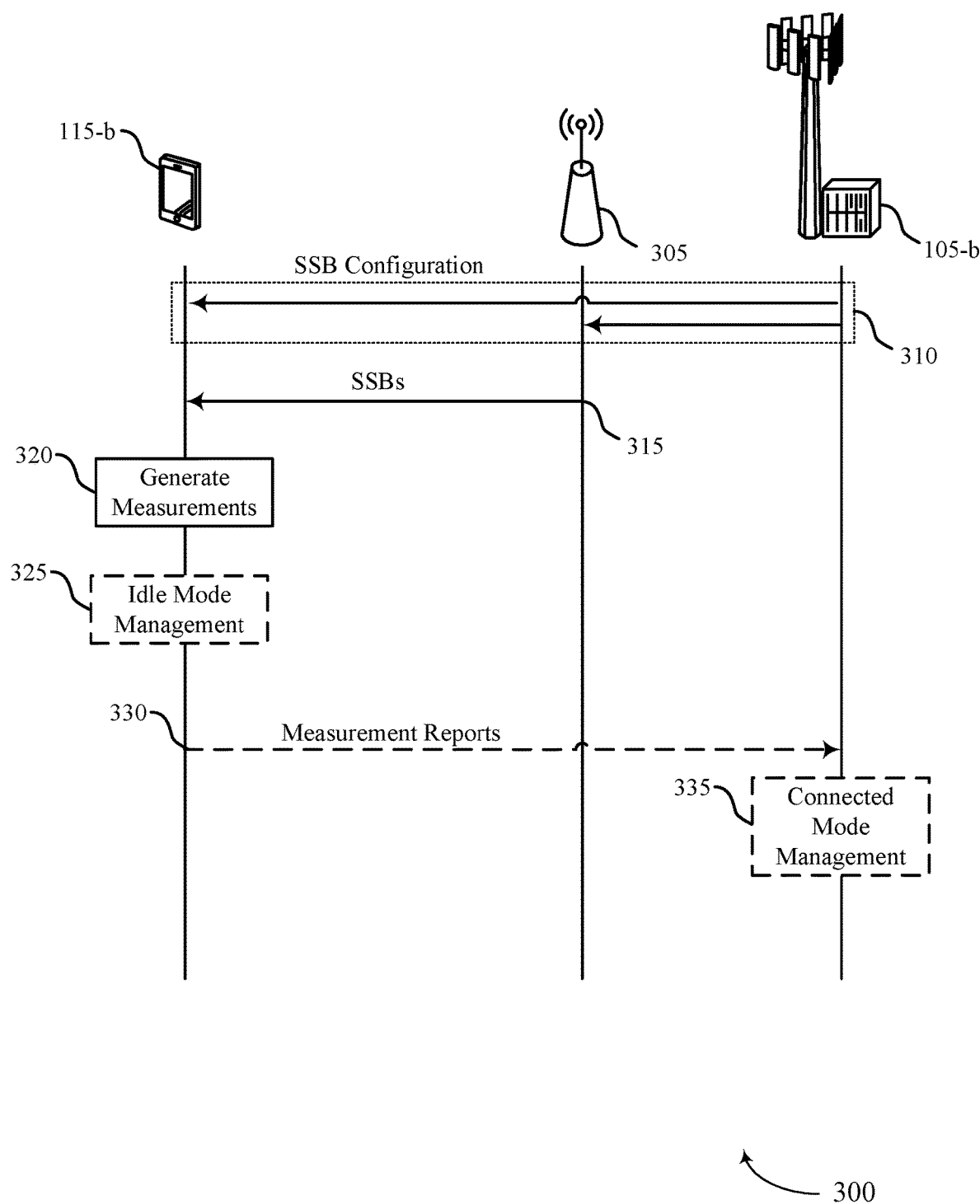
FIG. 3 illustrates an example of a process flow that supports techniques for efficient mobility using relay devices in accordance with aspects of the present disclosure.

FIG. 3 illustrates an example of a process flow 300 that supports techniques for efficient mobility using relay devices in accordance with aspects of the present disclosure. The process flow 300 may be implemented by UE 115-*b*, a relay device 305, base station 105-*b*, or any combination thereof. UE 115-*b* and base station 105-*b* may be respective examples of a UE 115 and a base station 105 as described herein. In some cases, the relay device 305 may be positioned on a vehicle.

The process flow 300 may be implemented to support efficient mobility using relay devices. In some cases, the process flow 300 may include aspects or examples of a first example of techniques as described with reference to FIG. 2.

At 310, UE 115-*b* may receive a control message indicating a set of multiple SSB indexes corresponding to a set of multiple SSB resources, the control message indicating that a first index of the set of multiple indexes is associated with a first antenna of the relay device 310 positioned on an interior of a vehicle. Base station 105-*b* may transmit control signaling configuring the relay device 310 to transmit a set of multiple SSBs using the set of multiple SSB resources via the set of multiple antennas.

At 315, the relay device 305 may transmit the set of multiple SSBs using the set of multiple SSB resources. For example, the relay device may transmit SSBs using the interior antenna and exterior antennas.

At 320, UE 115-*b* may generate a first set of multiple SSB measurements for the set of multiple SSB resources. For example, UE 115-*b* may measure each SSB transmitted by the relay device 305, including SSBs transmitted via the interior antenna and the SSBs transmitted by the exterior antennas. In some cases, UE 115-*b* may compare the measurements to thresholds. For example, UE 115-*b* may compare an SSB measurement associated with the interior antenna to a threshold. In some cases, UE 115-*b* may determine a difference between an SSB measurement for the interior antenna and an SSB measurement for the exterior antennas, and UE 115-*b* may compare the difference to a threshold. In some examples, the SSB measurements may be RSRP measurements.

In some cases, at 325, UE 115-*b* may perform idle mode management. For example, UE 115-*b* may be operating in an idle mode. UE 115-*b* may determine whether to camp on the relay device 305 based on the SSB measurements. For example, UE 115-*b* may determine whether UE 115-*b* is inside a vehicle equipped with the relay device 305. If the SSB measurement for the interior antenna exceeds the threshold, UE 115-*b* may determine that UE 115-*b* is inside the vehicle. Additionally, or alternatively, if the difference of measurements for interior and exterior antennas exceeds the threshold, UE 115-*b* may determine that UE 115-*b* is inside the vehicle. If the measurements are below the thresholds, UE 115-*b* may determine that UE 115-*b* is outside the vehicle. If UE 115-*b* is inside the vehicle, UE 115-*b* may camp on, or associate with, the relay device 305.

In some examples, UE 115-*b* may be operating in a connected mode. For example, UE 115-*b* may have a connection established with base station 105-*b*. At 330, UE 115-*b* may transmit a measurement report to base station 105-*b*. In some cases, the measurement report may indicate whether the SSB measurement corresponding to the first, or interior, antenna satisfies a threshold. In some examples, UE 115-*b* may include SSB measurements for each SSB in the measurement report. In some examples, the measurement report may be relayed to base station 105-*b* via the relay device 305.

If UE 115-*b* is operating in the connected mode, base station 105-*b* may perform connected mode management at 335. For example, base station 105-*b* may determine whether UE 115-*b* is inside the vehicle, outside the vehicle, or has exited the vehicle based on the measurement reports. For example, if the SSB measurement for the interior antenna exceeds the threshold, base station 105-*b* may determine that UE 115-*b* is inside the vehicle. Additionally, or alternatively, if the difference of measurements for interior and exterior antennas exceeds the threshold, base station 105-*b* may determine that UE 115-*b* is inside the vehicle. If base station 105-*b* receives the measurement report indicating that the SSB measurement for the interior antenna fails to satisfy the threshold, base station 105-*b* may determine that UE 115-*b* is outside the vehicle.

In some cases, base station 105-*b* may transmit a configuration message instructing UE 115-*b* to perform a handover procedure from base station 105-*b* to the relay device 305 based on the SSB measurement. For example, base station 105-*b* may determine that UE 115-*b* is in the car and configure UE 115-*b* to connect to the relay device 305. In some cases, while UE 115-*b* is in the vehicle (e.g., and the measurement reports indicate that the SSB measurement for the interior antenna satisfy the threshold), base station 105-*b* may refrain from configuring a handover procedure for UE 115-*b*.

If base station 105-*b* determines that UE 115-*b* is not in the vehicle, base station 105-*b* may configure UE 115-*b* to establish a secondary link with the relay device 305. If UE 115-*b* exits the vehicle, base station 105-*b* may configure UE 115-*b* to establish a connection (e.g., a primary connection) with base station 105-*b*, and base station 105-*b* may configure UE 115-*b* to establish a secondary connection with the relay device 305.

Figure 4:
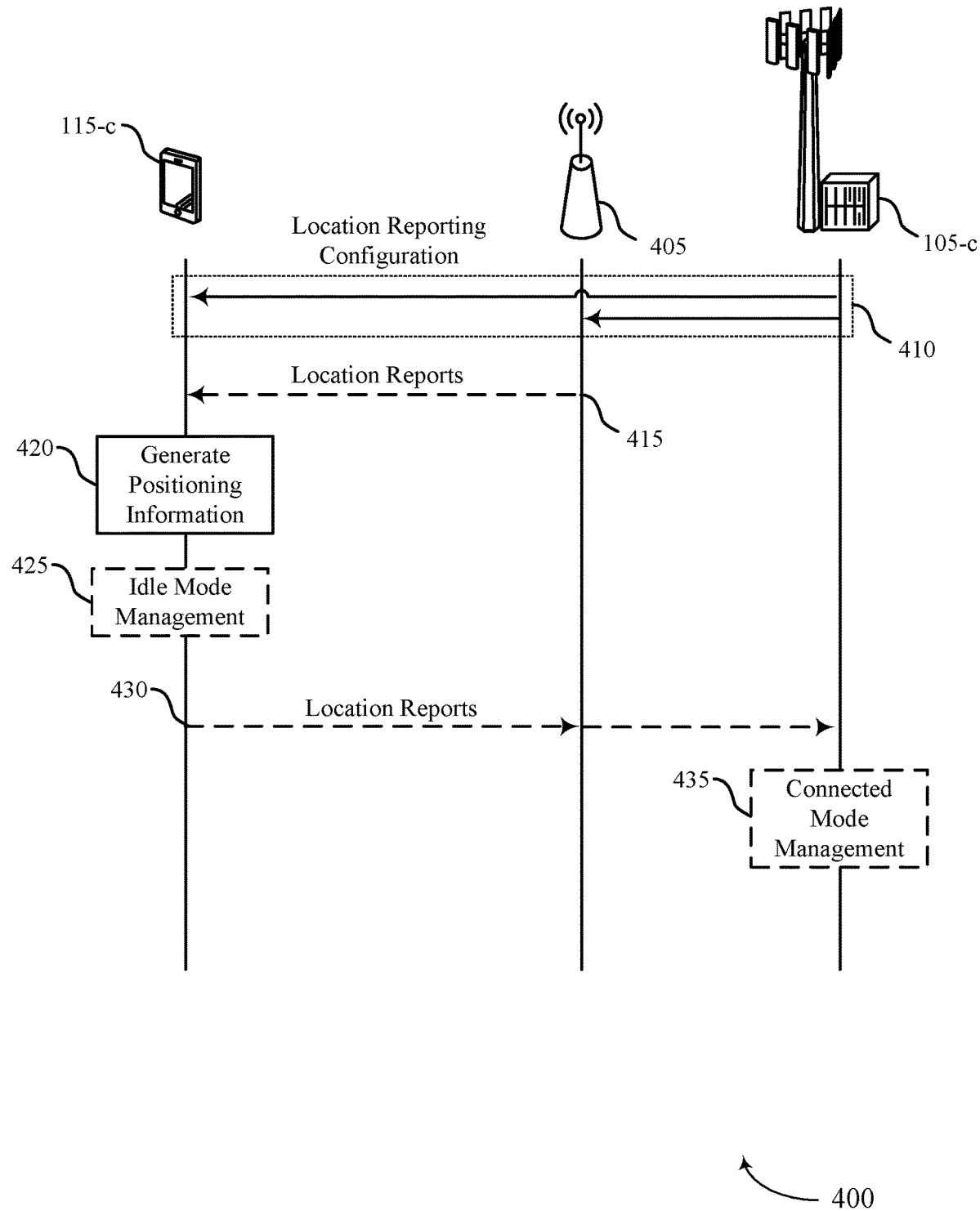
FIG. 4 illustrates an example of a process flow that supports techniques for efficient mobility using relay devices in accordance with aspects of the present disclosure.

FIG. 4 illustrates an example of a process flow 400 that supports techniques for efficient mobility using relay devices in accordance with aspects of the present disclosure. The process flow 400 may be implemented by UE 115-*c*, a relay device 405, base station 105-*c*, or any combination thereof. UE 115-*c* and base station 105-*c* may be respective examples of a UE 115 and a base station 105 as described herein. In some cases, the relay device 405 may be positioned on a vehicle.

The process flow 400 may be implemented to support efficient mobility using relay devices. In some cases, the process flow 400 may include aspects or examples of a second example of techniques as described with reference to FIG. 2.

In some cases, UE 115-*c* may operate in an idle mode. In some cases, at 410, UE 115-*c* may receive a control message configuring UE 115-*c* to monitor for location reporting messaging from a relay device positioned on a vehicle.

At 415, UE 115-*c* may receive at least one location reporting message from the relay device 405 indicating a first positioning information of the relay device. In some examples, the location reporting message from the relay device 405 may be broadcast over a sidelink channel. Positioning information may include or be based on geolocation information, heading, direction, speed, or any combination thereof.

At 420, UE 115-*c* may generate a second positioning information of UE 115-*c* while operating in the idle mode. For example, UE 115-*c* may determine its own location information. UE 115-*c* may determine whether the first positioning information of the relay device 405 and the second positioning information of UE 115-*c* correlate. In some cases, UE 115-*c* may determine that UE 115-*c* is inside the vehicle based on a correlation between the first information of the relay device 405 and the second positioning information of UE 115-*c* satisfying a threshold. For example, the positioning information may correlate for at least a threshold amount of time. For example, UE 115-*c* may determine that UE 115-*c* and the relay device 405 are traveling in a same direction at a same speed for a threshold amount of time and determine that UE 115-*c* is inside a vehicle equipped with the relay device 405.

At 425, UE 115-*c* may perform idle mode management. If UE 115-*c* determines that UE 115-*c* is inside the vehicle while operating in an idle mode, UE 115-*c* may camp on, or associate with, the relay device 405. For example, UE 115-*c* may perform a first cell selection procedure to associate with a cell of the relay device based on a correlation between the first positioning information of the relay device 405 and the second positioning information of UE 115-*c* satisfying a threshold. UE 115-*c* may continue to camp on the relay device 405 while inside the vehicle. For example, UE 115-*c* may continue to receive location reports from the relay device 405 and continue to determine positioning information for UE 115-*c*, and UE 115-*c* may camp on the cell of the relay device while the positioning information is correlated.

In some examples, UE 115-*c* may operate in a connected mode. For example, at 410, base station 105-*c* may transmit, to UE 115-*c*, a control message configuring UE 115-*c* to transmit a location reporting message. In some examples, UE 115-*c* may monitor for the location reporting messages while operating in the idle mode, and UE 115-*c* may transmit location reporting messages while operating in a connected mode.

At 420, UE 115-*c* may generate a second positioning information of UE 115-*c* while operating in the connected mode. At 430, UE 115-*c* may transmit a UE location report indicating the second positioning information for UE 115-*c*. In some example, if UE 115-*c* receives a location report from the relay device 405, UE 115-*c* may indicate both the first positioning information for the relay device 405 and the second positioning information for UE 115-*c*.

Base station 105-*c* may receive at least one location reporting message indicating a first positioning information of the relay device 405 and a second positioning information of UE 115-*c*. At 435, base station 105-*c* may perform connected mode management for UE 115-*c*. For example, base station 105-*c* may determine whether UE 115-*c* is inside or outside of the vehicle based on the positioning information of UE 115-*c* and the relay device 405.

In some cases, base station 105-*c* may determine that UE 115-*c* is inside the vehicle equipped with the relay device 405. Base station 105-*c* may transmit a configuration message instructing UE 115-*c* to perform a handover procedure from base station 105-*c* to the relay device 405 based on a correlation between the first positioning information of the relay device 405 and the second positioning information of UE 115-*c* satisfying a threshold.

In some cases, UE 115-*c* may remain connected to the relay device 405 while inside the vehicle and operating in the connected mode. For example, base station 105-*c* may receive new positioning information for UE 115-*c* and the relay device 405. Base station 105-*c* may refrain from configuring a handover procedure for UE 115-*c* while the positioning information for the relay device and the positioning information for UE 115-*c* satisfy the threshold.

If UE 115-*c* exits the vehicle, base station 105-*c* may configure a handover procedure for UE 115-*c*. For example, base station 105-*c* may receive updated positioning information for UE 115-*c* and the relay device 405. Base station 105-*c* may configure a handover procedure for UE 115-*c* from the relay device to a base station 105 (e.g., to base station 105-*c* or another macro base station 105) based on a second correlation between the positioning information of the relay device 405 and the positioning information of UE 115-*c* failing to satisfy a threshold.

In some cases, base station 105-*c* may determine that UE 115-*c* is not inside the vehicle. For example, base station 105-*c* may determine that UE 115-*c* is outside the vehicle based on positioning information of UE 115-*c* and positioning information of the relay device 405 failing to satisfy a threshold. In this example, UE 115-*c* may maintain a connection to base station 105-*c*. In some cases, base station 105-*c* may configure UE 115-*c* to establish a secondary connection with a cell of the relay device 405.

Figure 5:
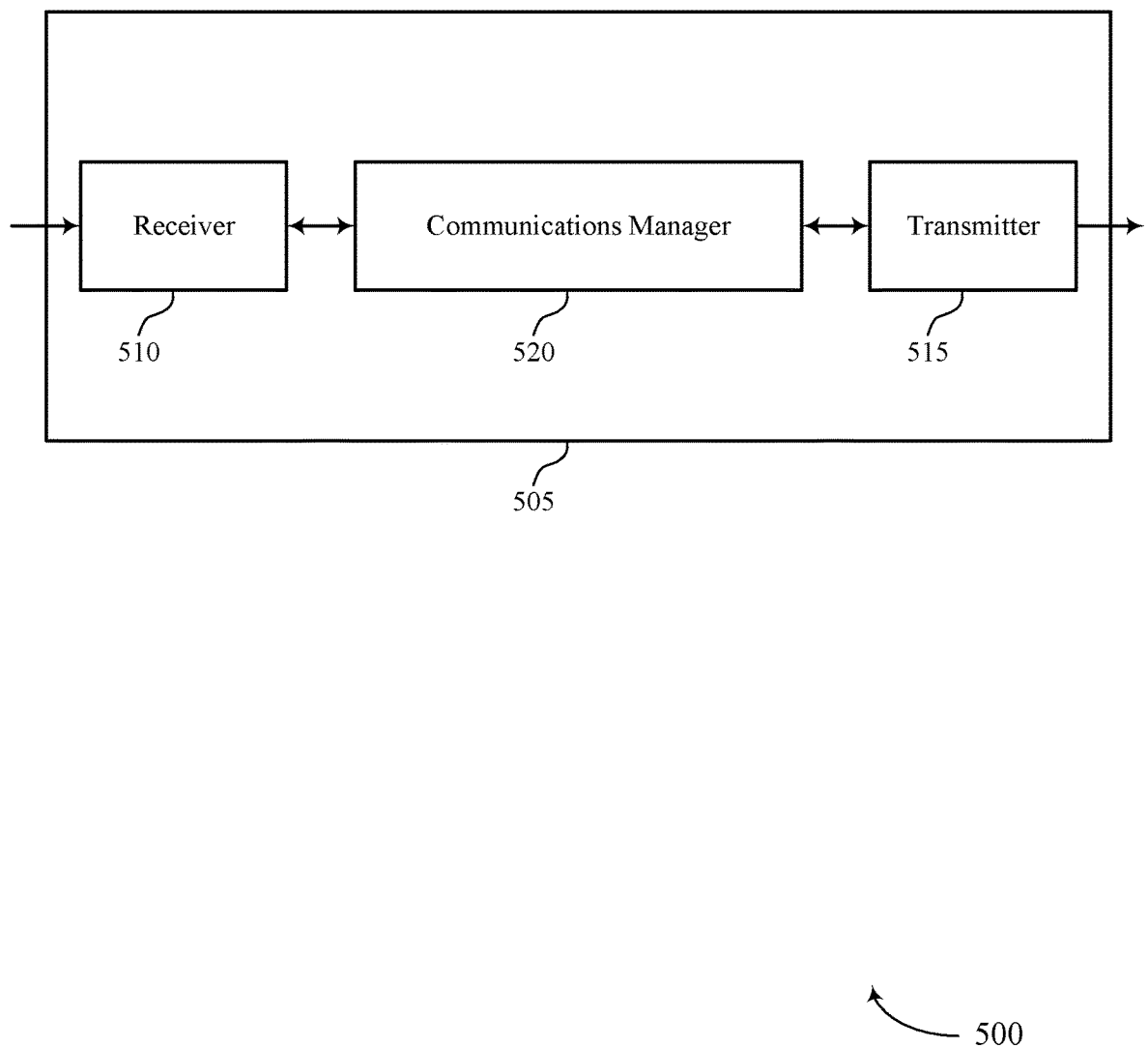
FIGS. 5 and 6 show block diagrams of devices that support techniques for efficient mobility using relay devices in accordance with aspects of the present disclosure.

FIG. 5 shows a block diagram 500 of a device 505 that supports techniques for efficient mobility using relay devices in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for efficient mobility using relay devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for efficient mobility using relay devices). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for efficient mobility using relay devices as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The communications manager 520 may be configured as or otherwise support a means for generating a first set of multiple SS/PBCH block measurements for the set of multiple SS/PBCH block resources. The communications manager 520 may be configured as or otherwise support a means for performing a first cell selection procedure to associate with a cell of the relay device based on a first SS/PBCH block measurement of the first set of multiple SS/PBCH block measurements corresponding to the first antenna satisfying a threshold.

Additionally or alternatively, the communications manager 520 may support wireless communications at a UE in accordance with examples as disclosed herein. For example, the communications manager 520 may be configured as or otherwise support a means for receiving a control message configuring the UE to monitor for location reporting messaging from a relay device positioned on a vehicle. The communications manager 520 may be configured as or otherwise support a means for receiving at least one location reporting message from the relay device indicating first positioning information of the relay device. The communications manager 520 may be configured as or otherwise support a means for generating a second positioning information of the UE. The communications manager 520 may be configured as or otherwise support a means for performing a first cell selection procedure to associate with a cell of the relay device based on a correlation between the first positioning information of the relay device and the second positioning information of the UE satisfying a threshold.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for efficient camping techniques for a UE 115 operating in idle mode or efficient connected mode mobility for a UE 115. For example, if the UE 115 is operating in idle mode and determines that the UE 115 is inside a vehicle with a relay device, the UE 115 may camp on, or associate with, the relay device. The relay device may provide a more reliable connection than base stations 105 while the UE 115 is inside the vehicle, ensuring a higher quality or faster connection for the UE 115. Additionally, the connected mode mobility may reduce a number of handovers for the UE 115. For example, if the UE 115 is in the vehicle, the UE 115 may connect to the relay device, which may provide a more reliable connection as the UE 115 travels along with the vehicle.

Figure 6:
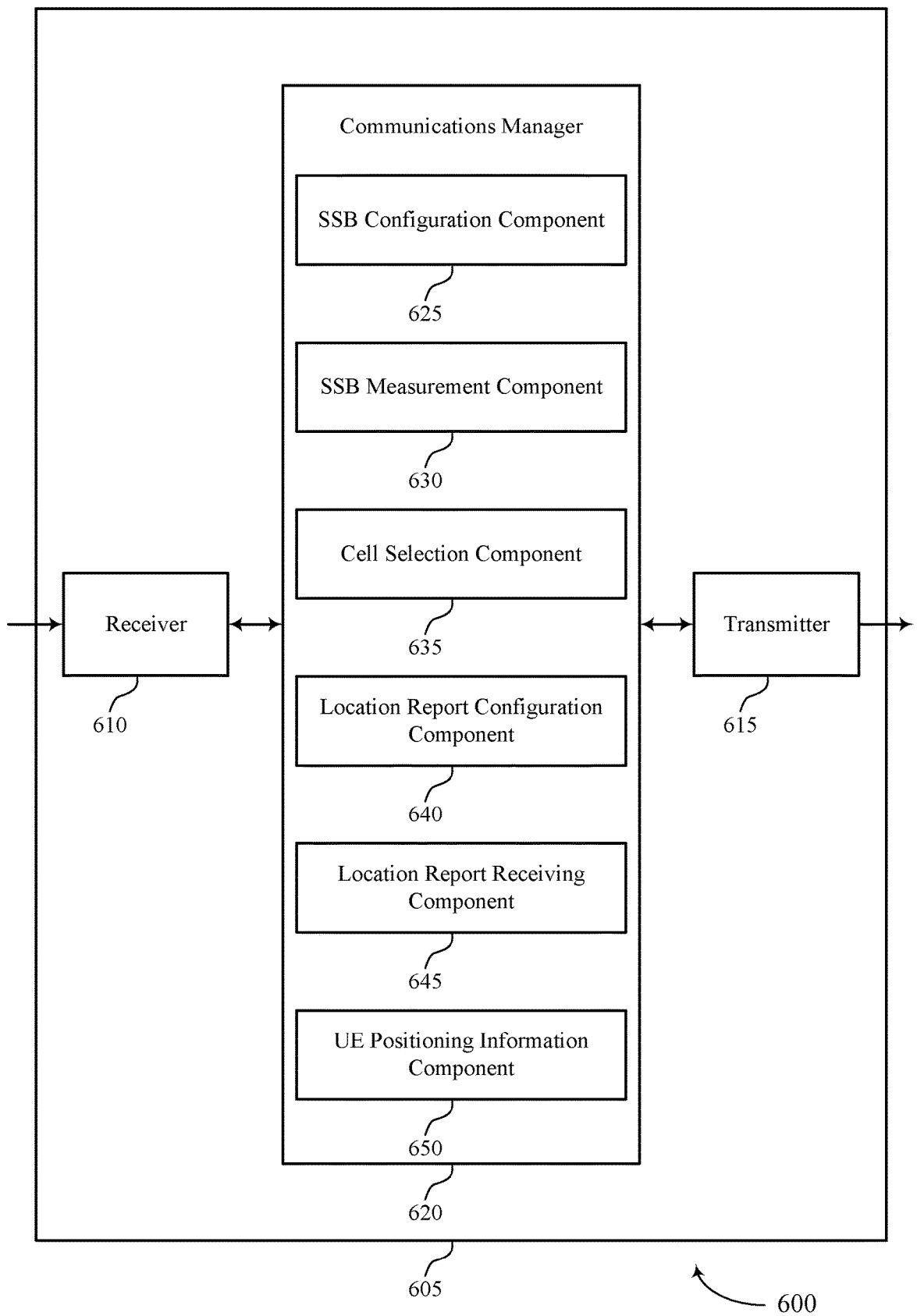

FIG. 6 shows a block diagram 600 of a device 605 that supports techniques for efficient mobility using relay devices in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for efficient mobility using relay devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for efficient mobility using relay devices). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for efficient mobility using relay devices as described herein. For example, the communications manager 620 may include an SSB configuration component 625, an SSB measurement component 630, a cell selection component 635, a location report configuration component 640, a location report receiving component 645, a UE positioning information component 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The SSB configuration component 625 may be configured as or otherwise support a means for receiving a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The SSB measurement component 630 may be configured as or otherwise support a means for generating a first set of multiple SS/PBCH block measurements for the set of multiple SS/PBCH block resources. The cell selection component 635 may be configured as or otherwise support a means for performing a first cell selection procedure to associate with a cell of the relay device based on a first SS/PBCH block measurement of the first set of multiple SS/PBCH block measurements corresponding to the first antenna satisfying a threshold.

Additionally or alternatively, the communications manager 620 may support wireless communications at a UE in accordance with examples as disclosed herein. The location report configuration component 640 may be configured as or otherwise support a means for receiving a control message configuring the UE to monitor for location reporting messaging from a relay device positioned on a vehicle. The location report receiving component 645 may be configured as or otherwise support a means for receiving at least one location reporting message from the relay device indicating first positioning information of the relay device. The UE positioning information component 650 may be configured as or otherwise support a means for generating a second positioning information of the UE. The cell selection component 635 may be configured as or otherwise support a means for performing a first cell selection procedure to associate with a cell of the relay device based on a correlation between the first positioning information of the relay device and the second positioning information of the UE satisfying a threshold.

Figure 7:
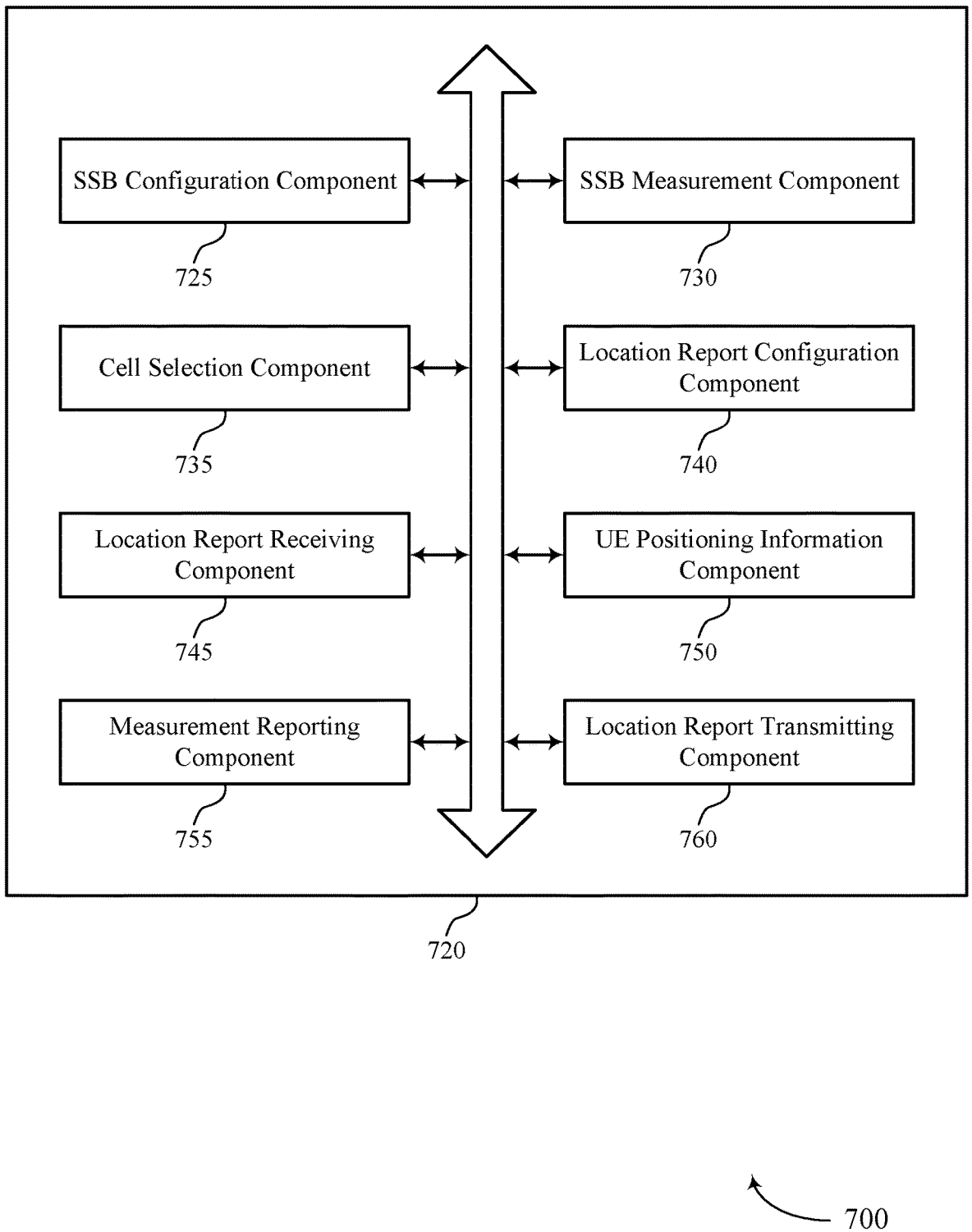
FIG. 7 shows a block diagram of a communications manager that supports techniques for efficient mobility using relay devices in accordance with aspects of the present disclosure.

FIG. 7 shows a block diagram 700 of a communications manager 720 that supports techniques for efficient mobility using relay devices in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for efficient mobility using relay devices as described herein. For example, the communications manager 720 may include an SSB configuration component 725, an SSB measurement component 730, a cell selection component 735, a location report configuration component 740, a location report receiving component 745, a UE positioning information component 750, a measurement reporting component 755, a location report transmitting component 760, or any combination thereof. Each of these components may communicate, directly or indirectly, with one another (e.g., via one or more buses).

The communications manager 720 may support wireless communications at a UE in accordance with examples as disclosed herein. The SSB configuration component 725 may be configured as or otherwise support a means for receiving a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The SSB measurement component 730 may be configured as or otherwise support a means for generating a first set of multiple SS/PBCH block measurements for the set of multiple SS/PBCH block resources. The cell selection component 735 may be configured as or otherwise support a means for performing a first cell selection procedure to associate with a cell of the relay device based on a first SS/PBCH block measurement of the first set of multiple SS/PBCH block measurements corresponding to the first antenna satisfying a threshold.

In some examples, the SSB measurement component 730 may be configured as or otherwise support a means for generating a second set of multiple SS/PBCH block measurements. In some examples, the SSB measurement component 730 may be configured as or otherwise support a means for performing a second cell selection procedure based on a second SS/PBCH block measurement of the second set of multiple SS/PBCH block measurements corresponding to the first antenna failing to satisfy the threshold.

In some examples, the SSB measurement component 730 may be configured as or otherwise support a means for generating a second set of multiple SS/PBCH block measurements. In some examples, the measurement reporting component 755 may be configured as or otherwise support a means for transmitting a measurement report indicating a second SS/PBCH block measurement of the second set of multiple SS/PBCH block measurements.

In some examples, the measurement reporting component 755 may be configured as or otherwise support a means for receiving a configuration message instructing the UE to perform a handover procedure to establish a primary link with the cell of the relay device based on the second SS/PBCH block measurement satisfying the threshold. In some examples, the measurement reporting component 755 may be configured as or otherwise support a means for establishing the primary link with the cell of the relay device based on the configuration message.

In some examples, the measurement reporting component 755 may be configured as or otherwise support a means for receiving a configuration message instructing the UE to establish a secondary link with the cell of the relay device based on the second SS/PBCH block measurement not satisfying the threshold. In some examples, the measurement reporting component 755 may be configured as or otherwise support a means for establishing the secondary link with the cell of the relay device based on the configuration message.

In some examples, the SSB measurement component 730 may be configured as or otherwise support a means for generating a second set of multiple SS/PBCH block measurements. In some examples, the SSB measurement component 730 may be configured as or otherwise support a means for refraining from performing a second cell selection procedure based on a second SS/PBCH block measurement of the second set of multiple SS/PBCH block measurements corresponding to the first antenna satisfying the threshold.

In some examples, the SSB measurement component 730 may be configured as or otherwise support a means for determining that the UE is inside the vehicle based at last in part on the first SS/PBCH block measurement measured by the UE for the first antenna exceeding the threshold.

In some examples, the SSB measurement component 730 may be configured as or otherwise support a means for determining that the UE is inside the vehicle based at last in part on a difference between the first SS/PBCH block measurement measured by the UE for the first antenna and at least one other SS/PBCH block measurement of the first set of multiple SS/PBCH block measurements exceeding a second threshold.

In some examples, the at least one other SS/PBCH block measurement correspond to one or more antennas of the relay device positioned on an exterior of the vehicle.

In some examples, the first SS/PBCH block measurement is a reference signal received power measurement.

Additionally or alternatively, the communications manager 720 may support wireless communications at a UE in accordance with examples as disclosed herein. The location report configuration component 740 may be configured as or otherwise support a means for receiving a control message configuring the UE to monitor for location reporting messaging from a relay device positioned on a vehicle. The location report receiving component 745 may be configured as or otherwise support a means for receiving at least one location reporting message from the relay device indicating first positioning information of the relay device. The UE positioning information component 750 may be configured as or otherwise support a means for generating a second positioning information of the UE. In some examples, the cell selection component 735 may be configured as or otherwise support a means for performing a first cell selection procedure to associate with a cell of the relay device based on a correlation between the first positioning information of the relay device and the second positioning information of the UE satisfying a threshold.

In some examples, the location report transmitting component 760 may be configured as or otherwise support a means for transmitting a UE location report indicating the first positioning information or the second positioning information, or both.

In some examples, the location report transmitting component 760 may be configured as or otherwise support a means for receiving a configuration message instructing the UE to establish a primary link or a secondary link with the relay device based on the UE location report.

In some examples, the location report receiving component 745 may be configured as or otherwise support a means for receive a second location reporting message from the relay device including a third positioning information for the relay device. In some examples, the location report receiving component 745 may be configured as or otherwise support a means for generating a fourth positioning information of the UE. In some examples, the location report receiving component 745 may be configured as or otherwise support a means for performing a second cell selection procedure based on a second correlation between the third positioning information of the relay device and the fourth positioning information of the UE failing to satisfy the threshold.

In some examples, the location report receiving component 745 may be configured as or otherwise support a means for determining that the UE is outside of the vehicle based on the correlation between the third positioning information of the relay device and the fourth positioning information of the UE not satisfying the threshold.

In some examples, the location report receiving component 745 may be configured as or otherwise support a means for receiving a second location reporting message from the relay device including a third positioning information for the relay device. In some examples, the location report receiving component 745 may be configured as or otherwise support a means for generating a fourth positioning information of the UE. In some examples, the location report receiving component 745 may be configured as or otherwise support a means for refraining from performing a second cell selection procedure based on a second correlation between the third positioning information of the relay device and the fourth positioning information of the UE satisfying the threshold.

In some examples, the cell selection component 735 may be configured as or otherwise support a means for determining that the UE is inside the vehicle based on the correlation between the first positioning information of the relay device and the second positioning information of the UE satisfying the threshold.

In some examples, the first positioning information and the second positioning information are based on geolocation information, heading, direction, speed, or any combination thereof. In some examples, the correlation is based on a commonality between the first positioning information and the second positioning information for at least a threshold interval of time.

Figure 8:
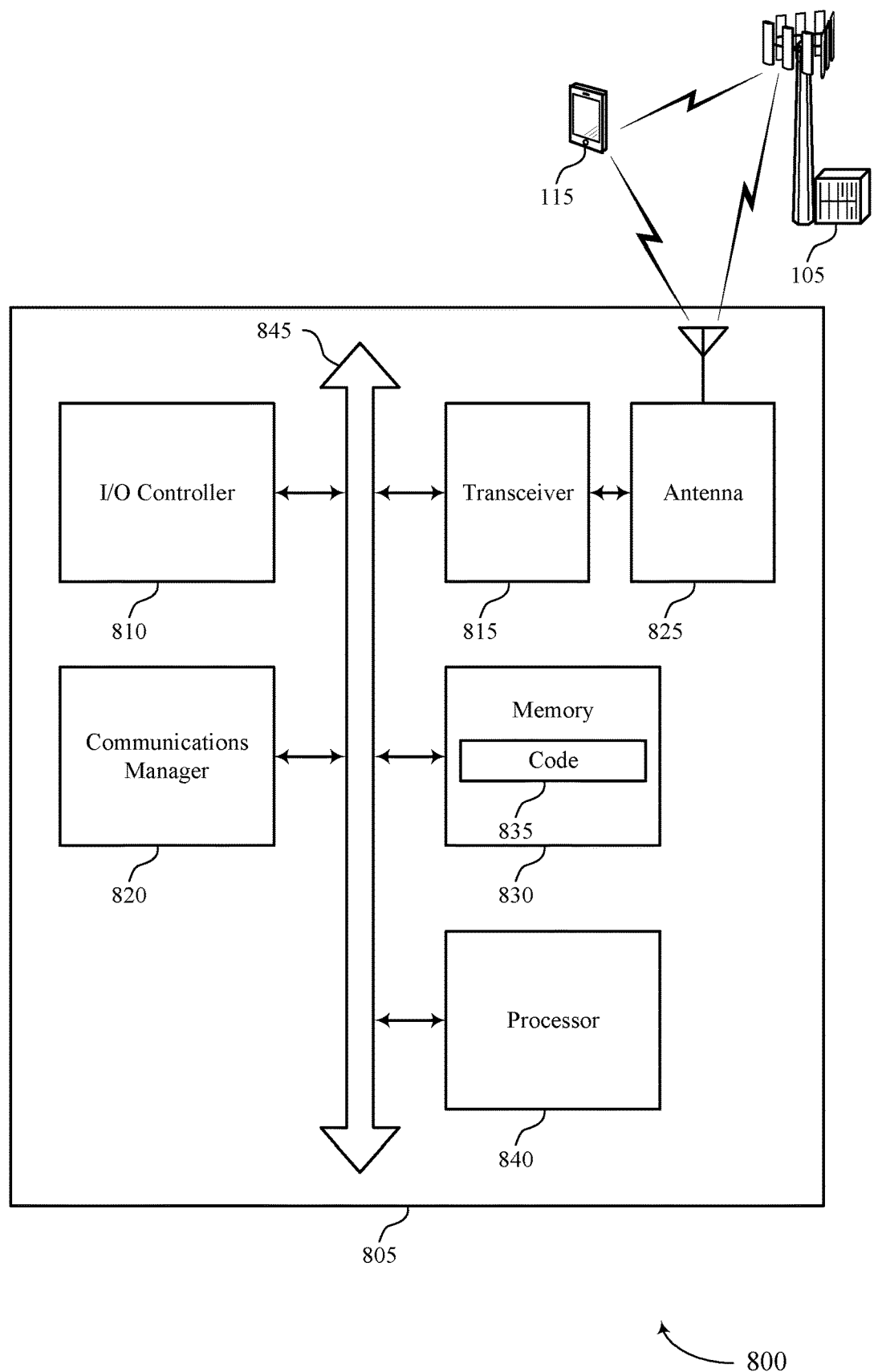
FIG. 8 shows a diagram of a system including a device that supports techniques for efficient mobility using relay devices in accordance with aspects of the present disclosure.

FIG. 8 shows a diagram of a system 800 including a device 805 that supports techniques for efficient mobility using relay devices in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for efficient mobility using relay devices). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a control message indicating a set of multiple SS/PBCH indexes corresponding to a set of multiple SS/PBCH block resources, the control message indicating that a first index of the set of multiple indexes is associated with a first antenna of a relay device positioned on an interior of a vehicle. The communications manager 820 may be configured as or otherwise support a means for generating a first set of multiple SS/PBCH block measurements for the set of multiple SS/PBCH block resources. The communications manager 820 may be configured as or otherwise support a means for performing a first cell selection procedure to associate with a cell of the relay device based on a first SS/PBCH block measurement of the first set of multiple SS/PBCH block measurements corresponding to the first antenna satisfying a threshold.

Additionally or alternatively, the communications manager 820 may support wireless communications at a UE in accordance with examples as disclosed herein. For example, the communications manager 820 may be configured as or otherwise support a means for receiving a control message configuring the UE to monitor for location reporting messaging from a relay device positioned on a vehicle. The communications manager 820 may be configured as or otherwise support a means for receiving at least one location reporting message from the relay device indicating first positioning information of the relay device. The communications manager 820 may be configured as or otherwise support a means for generating a second positioning information of the UE. The communications manager 820 may be configured as or otherwise support a means for performing a first cell selection procedure to associate with a cell of the relay device based on a correlation between the first positioning information of the relay device and the second positioning information of the UE satisfying a threshold.

By including or configuring the communications manager 820 in accordance with examples as described herein, the device 805 may support techniques for efficient connected mode mobility for a base station 105 managing mobility of a UE 115. The relay device may provide a more reliable connection than base stations 105 while the UE 115 is inside the vehicle. These techniques for connected mode mobility may reduce a number of handovers for the UE 115. For example, if the UE 115 is in the vehicle, the UE 115 may connect to the relay device, which may provide a more reliable connection than base stations 105 as the UE 115 travels along with the vehicle.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for efficient mobility using relay devices as described herein, or the processor 840 and the memory 830 may be otherwise configured to perform or support such operations.

Figure 9:
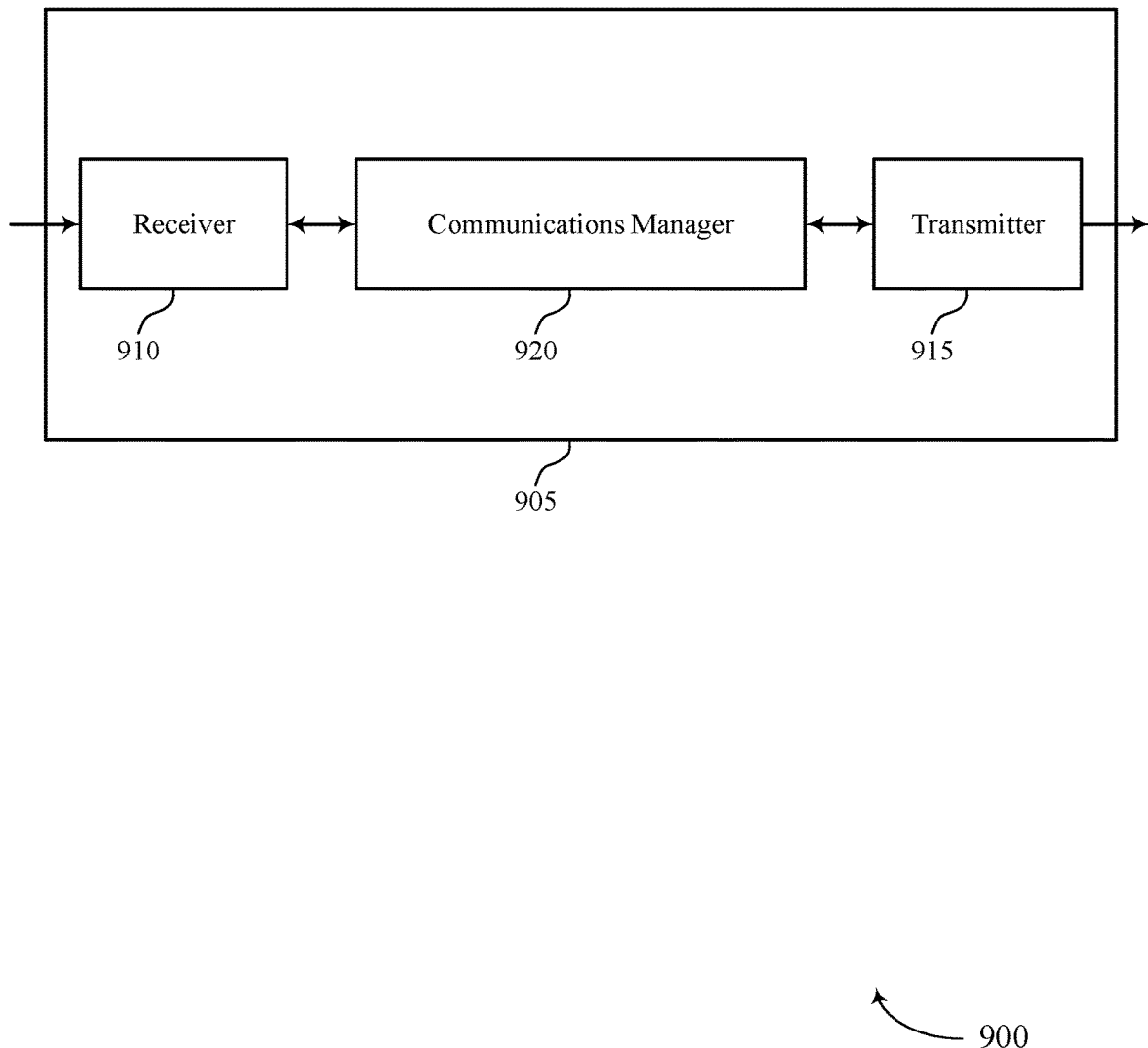
FIGS. 9 and 10 show block diagrams of devices that support techniques for efficient mobility using relay devices in accordance with aspects of the present disclosure.

FIG. 9 shows a block diagram 900 of a device 905 that supports techniques for efficient mobility using relay devices in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for efficient mobility using relay devices). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for efficient mobility using relay devices). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for efficient mobility using relay devices as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The communications manager 920 may be configured as or otherwise support a means for transmitting control signaling configuring the relay device to transmit a set of multiple SS/PBCH blocks using the set of multiple SS/PBCH block resources via a set of multiple antennas including at least the first antenna in accordance with the control message. The communications manager 920 may be configured as or otherwise support a means for receiving a first measurement report from the UE indicating a first SS/PBCH block measurement corresponding to the first antenna satisfies a threshold. The communications manager 920 may be configured as or otherwise support a means for transmitting a configuration message instructing the UE to perform a handover procedure from the base station to the relay based on the first SS/PBCH block measurement.

Additionally or alternatively, the communications manager 920 may support wireless communications at a base station in accordance with examples as disclosed herein. For example, the communications manager 920 may be configured as or otherwise support a means for transmitting, to a UE, a control message configuring the UE to transmit a location reporting messaging. The communications manager 920 may be configured as or otherwise support a means for receiving at least one location reporting message indicating a first positioning information of a relay device on a vehicle and a second positioning information of the UE. The communications manager 920 may be configured as or otherwise support a means for transmitting a configuration message instructing the UE to perform a handover procedure from the base station to the relay based on a correlation between the first positioning information of the relay device and the second positioning information of the UE satisfying a threshold.

Figure 10:
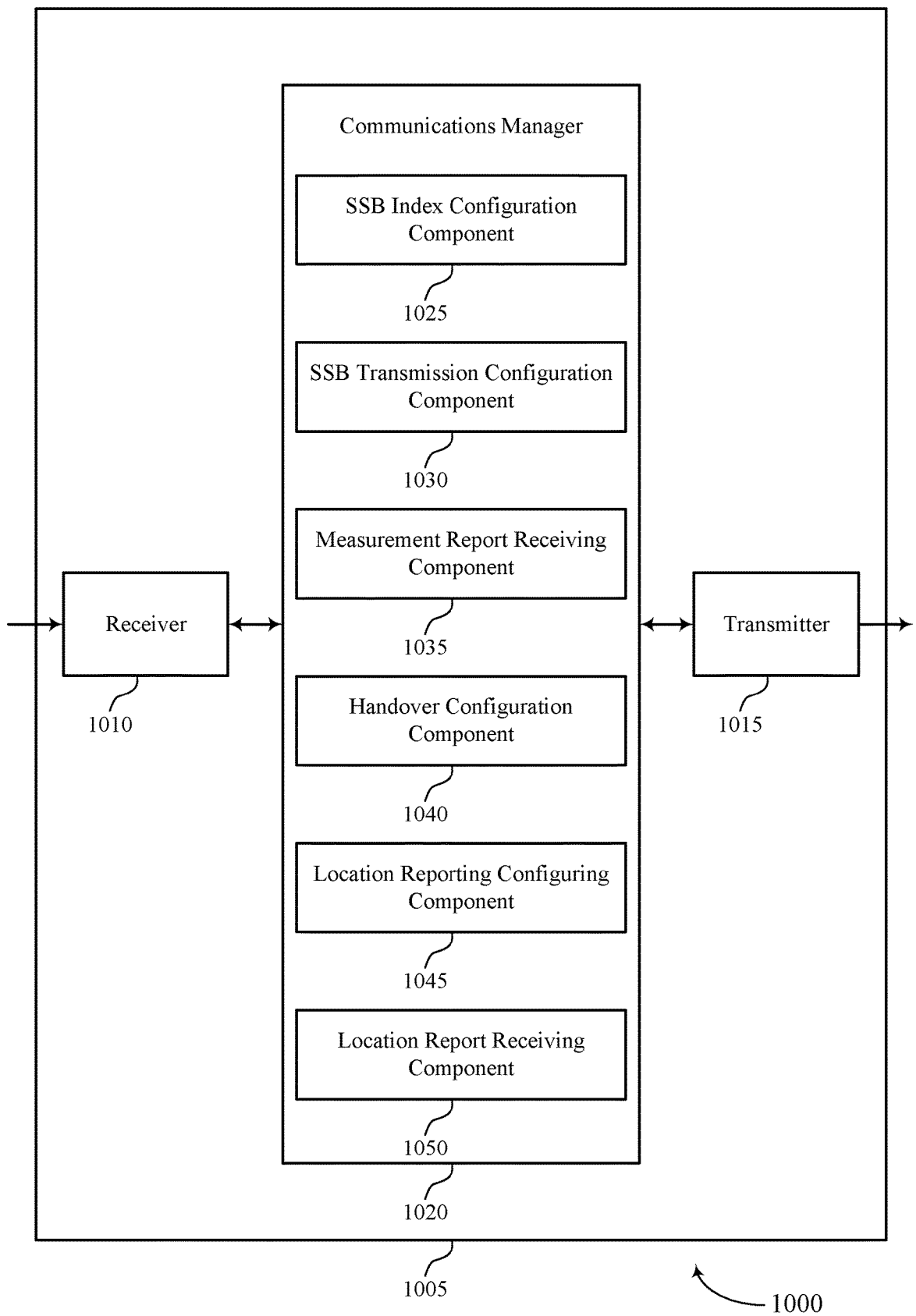

FIG. 10 shows a block diagram 1000 of a device 1005 that supports techniques for efficient mobility using relay devices in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for efficient mobility using relay devices). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for efficient mobility using relay devices). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for efficient mobility using relay devices as described herein. For example, the communications manager 1020 may include an SSB index configuration component 1025, an SSB transmission configuration component 1030, a measurement report receiving component 1035, a handover configuration component 1040, a location reporting configuring component 1045, a location report receiving component 1050, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The SSB index configuration component 1025 may be configured as or otherwise support a means for transmitting, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The SSB transmission configuration component 1030 may be configured as or otherwise support a means for transmitting control signaling configuring the relay device to transmit a set of multiple SS/PBCH blocks using the set of multiple SS/PBCH block resources via a set of multiple antennas including at least the first antenna in accordance with the control message. The measurement report receiving component 1035 may be configured as or otherwise support a means for receiving a first measurement report from the UE indicating a first SS/PBCH block measurement corresponding to the first antenna satisfies a threshold. The handover configuration component 1040 may be configured as or otherwise support a means for transmitting a configuration message instructing the UE to perform a handover procedure from the base station to the relay based on the first SS/PBCH block measurement.

Additionally or alternatively, the communications manager 1020 may support wireless communications at a base station in accordance with examples as disclosed herein. The location reporting configuring component 1045 may be configured as or otherwise support a means for transmitting, to a UE, a control message configuring the UE to transmit a location reporting messaging. The location report receiving component 1050 may be configured as or otherwise support a means for receiving at least one location reporting message indicating a first positioning information of a relay device on a vehicle and a second positioning information of the UE. The handover configuration component 1040 may be configured as or otherwise support a means for transmitting a configuration message instructing the UE to perform a handover procedure from the base station to the relay based on a correlation between the first positioning information of the relay device and the second positioning information of the UE satisfying a threshold.

Figure 11:
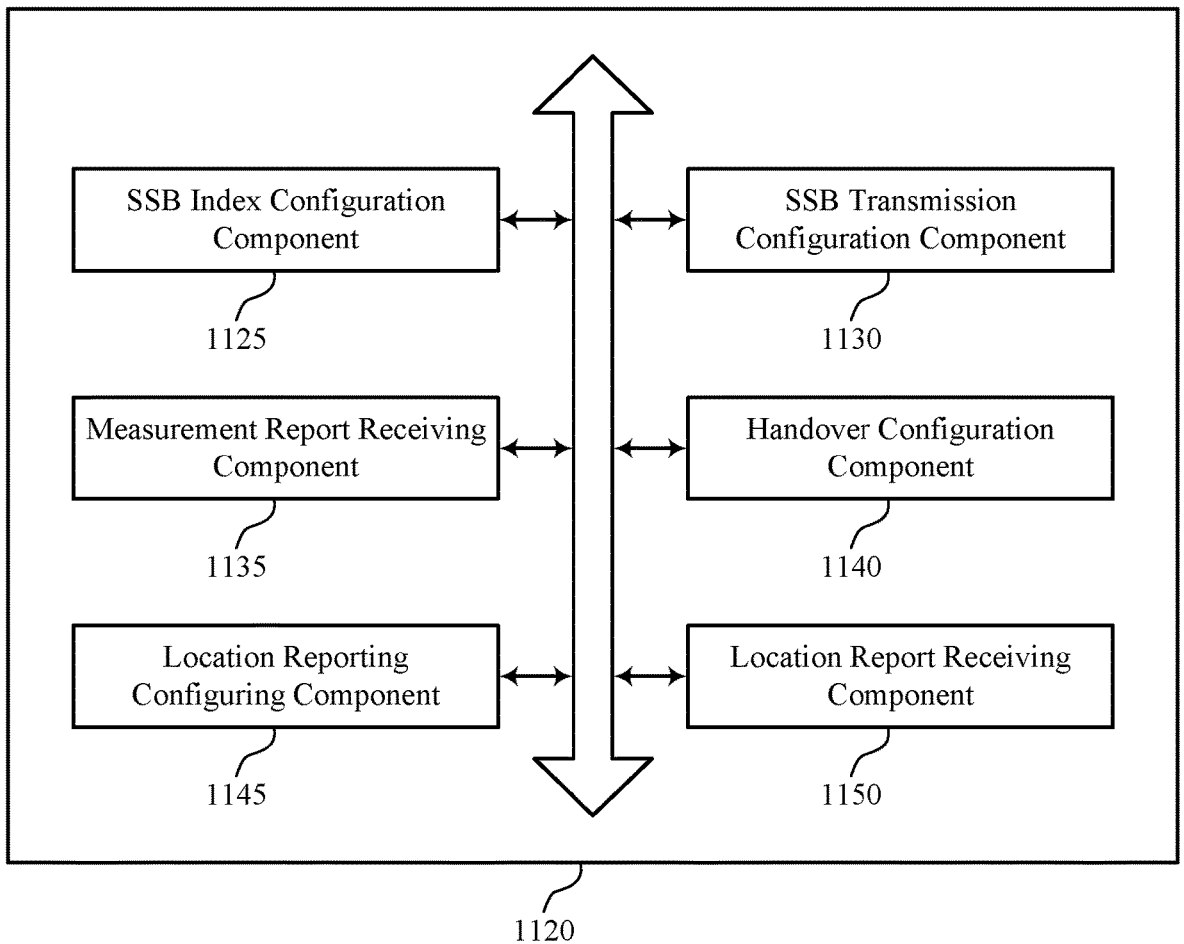
FIG. 11 shows a block diagram of a communications manager that supports techniques for efficient mobility using relay devices in accordance with aspects of the present disclosure.

FIG. 11 shows a block diagram 1100 of a communications manager 1120 that supports techniques for efficient mobility using relay devices in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for efficient mobility using relay devices as described herein. For example, the communications manager 1120 may include an SSB index configuration component 1125, an SSB transmission configuration component 1130, a measurement report receiving component 1135, a handover configuration component 1140, a location reporting configuring component 1145, a location report receiving component 1150, or any combination thereof. Each of these components may communicate, directly or indirectly, with one another (e.g., via one or more buses).

The communications manager 1120 may support wireless communications at a base station in accordance with examples as disclosed herein. The SSB index configuration component 1125 may be configured as or otherwise support a means for transmitting, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The SSB transmission configuration component 1130 may be configured as or otherwise support a means for transmitting control signaling configuring the relay device to transmit a set of multiple SS/PBCH blocks using the set of multiple SS/PBCH block resources via a set of multiple antennas including at least the first antenna in accordance with the control message. The measurement report receiving component 1135 may be configured as or otherwise support a means for receiving a first measurement report from the UE indicating a first SS/PBCH block measurement corresponding to the first antenna satisfies a threshold. The handover configuration component 1140 may be configured as or otherwise support a means for transmitting a configuration message instructing the UE to perform a handover procedure from the base station to the relay based on the first SS/PBCH block measurement.

In some examples, the measurement report receiving component 1135 may be configured as or otherwise support a means for receiving a second measurement report from the UE indicating a second SS/PBCH block measurement corresponding to the first antenna fails to satisfy the threshold.

In some examples, the measurement report receiving component 1135 may be configured as or otherwise support a means for configuring the UE to perform a handover from the relay device to the base station based on the second measurement report.

In some examples, the measurement report receiving component 1135 may be configured as or otherwise support a means for transmitting a second configuration message instructing the UE to establish a secondary link with the relay device based on the second SS/PBCH block measurement failing to satisfy the threshold.

In some examples, the measurement report receiving component 1135 may be configured as or otherwise support a means for receiving a second measurement report from the UE indicating a second SS/PBCH block measurement corresponding to the first antenna satisfies the threshold. In some examples, the measurement report receiving component 1135 may be configured as or otherwise support a means for refraining from configuring a handover procedure for the UE based on the second SS/PBCH block measurement.

In some examples, the measurement report receiving component 1135 may be configured as or otherwise support a means for determining that the UE is inside the vehicle based at last in part on the first SS/PBCH block measurement corresponding to the first antenna exceeding the threshold.

In some examples, the measurement report receiving component 1135 may be configured as or otherwise support a means for receiving a second measurement report from the UE indicating a second SS/PBCH block measurement corresponding to a second antenna of the relay device that is positioned on an exterior of the vehicle. In some examples, the measurement report receiving component 1135 may be configured as or otherwise support a means for determining that the UE is inside the vehicle based at last in part on a difference between the first SS/PBCH block measurement for the first antenna and the second SS/PBCH block measurement for the second antenna exceeding a second threshold. In some examples, the first SS/PBCH block measurement is a reference signal received power measurement.

Additionally or alternatively, the communications manager 1120 may support wireless communications at a base station in accordance with examples as disclosed herein. The location reporting configuring component 1145 may be configured as or otherwise support a means for transmitting, to a UE, a control message configuring the UE to transmit a location reporting messaging. The location report receiving component 1150 may be configured as or otherwise support a means for receiving at least one location reporting message indicating a first positioning information of a relay device on a vehicle and a second positioning information of the UE. In some examples, the handover configuration component 1140 may be configured as or otherwise support a means for transmitting a configuration message instructing the UE to perform a handover procedure from the base station to the relay based on a correlation between the first positioning information of the relay device and the second positioning information of the UE satisfying a threshold.

In some examples, the location report receiving component 1150 may be configured as or otherwise support a means for receiving the at least one location reporting message from the UE indicating the first positioning information or the second positioning information, or both. In some examples, the location report receiving component 1150 may be configured as or otherwise support a means for transmitting a second configuration message instructing the UE to establish a primary link or a secondary link with the relay device based on the at least one location reporting message.

In some examples, the location report receiving component 1150 may be configured as or otherwise support a means for receive at least a second location reporting message including a third positioning information for the UE and a fourth positioning information of the relay device. In some examples, the location report receiving component 1150 may be configured as or otherwise support a means for configuring a handover procedure for the UE from the relay device to the base station based on a second correlation between the third positioning information of the relay device and the fourth positioning information of the UE failing to satisfy the threshold.

In some examples, the location report receiving component 1150 may be configured as or otherwise support a means for determining that the UE is outside of the vehicle based on the correlation between the third positioning information of the relay device and the fourth positioning information of the UE not satisfying the threshold.

In some examples, the location report receiving component 1150 may be configured as or otherwise support a means for receiving at least a second location reporting message including a third positioning information for the UE and a fourth positioning information of the relay device. In some examples, the location report receiving component 1150 may be configured as or otherwise support a means for refraining from configuring a handover procedure for the UE based on a second correlation between the third positioning information of the relay device and the fourth positioning information of the UE satisfying the threshold.

In some examples, the handover configuration component 1140 may be configured as or otherwise support a means for determining that the UE is inside the vehicle based on the correlation between the first positioning information of the relay device and the second positioning information of the UE satisfying the threshold. In some examples, the first positioning information and the second positioning information are based on geolocation information, heading, direction, speed, or any combination thereof. In some examples, the correlation is based on a commonality between the first positioning information and the second positioning information for at least a threshold interval of time.

Figure 12:
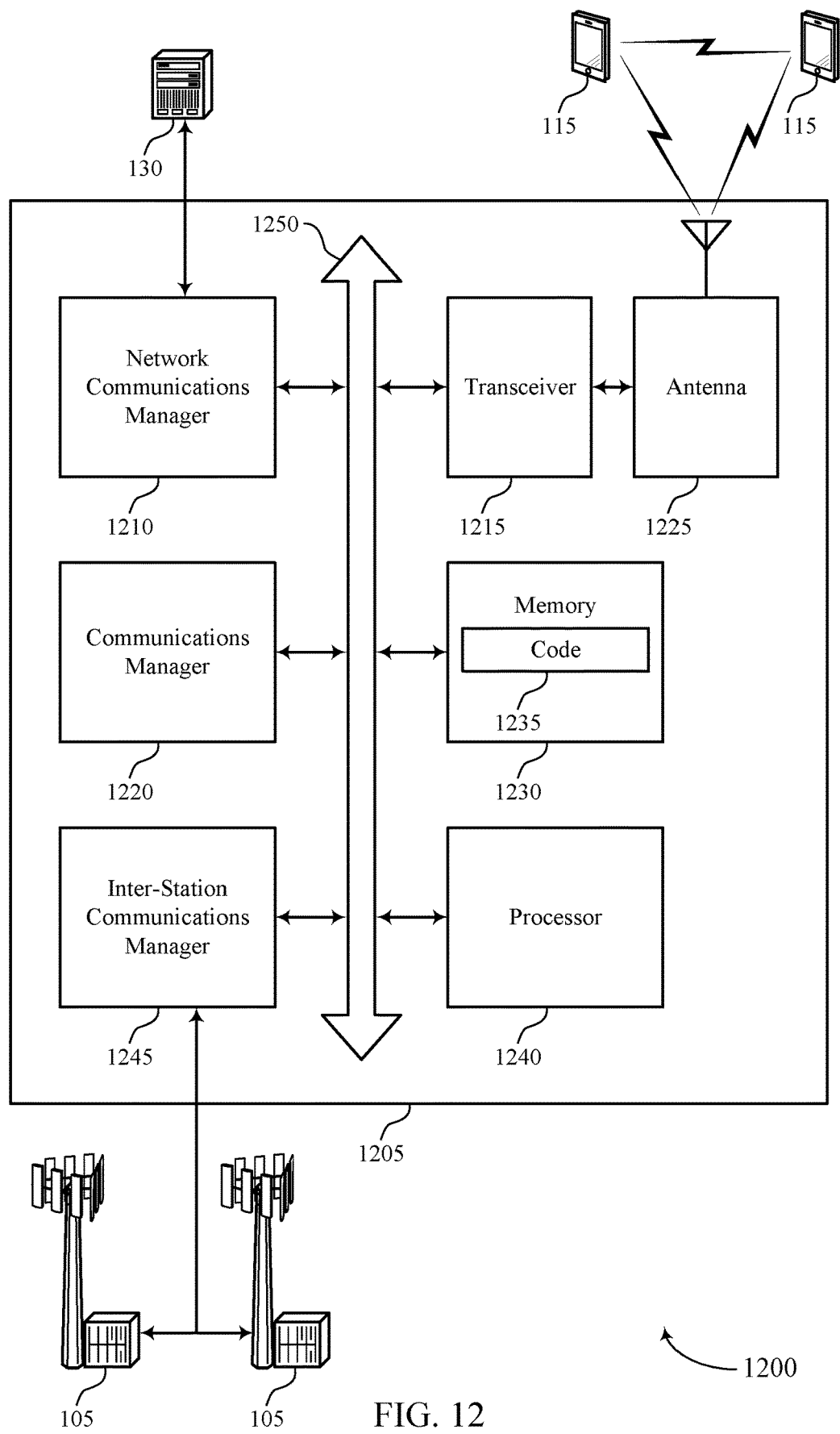
FIG. 12 shows a diagram of a system including a device that supports techniques for efficient mobility using relay devices in accordance with aspects of the present disclosure.

FIG. 12 shows a diagram of a system 1200 including a device 1205 that supports techniques for efficient mobility using relay devices in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for efficient mobility using relay devices). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The communications manager 1220 may be configured as or otherwise support a means for transmitting control signaling configuring the relay device to transmit a set of multiple SS/PBCH blocks using the set of multiple SS/PBCH block resources via a set of multiple antennas including at least the first antenna in accordance with the control message. The communications manager 1220 may be configured as or otherwise support a means for receiving a first measurement report from the UE indicating a first SS/PBCH block measurement corresponding to the first antenna satisfies a threshold. The communications manager 1220 may be configured as or otherwise support a means for transmitting a configuration message instructing the UE to perform a handover procedure from the base station to the relay based on the first SS/PBCH block measurement.

Additionally or alternatively, the communications manager 1220 may support wireless communications at a base station in accordance with examples as disclosed herein. For example, the communications manager 1220 may be configured as or otherwise support a means for transmitting, to a UE, a control message configuring the UE to transmit a location reporting messaging. The communications manager 1220 may be configured as or otherwise support a means for receiving at least one location reporting message indicating a first positioning information of a relay device on a vehicle and a second positioning information of the UE. The communications manager 1220 may be configured as or otherwise support a means for transmitting a configuration message instructing the UE to perform a handover procedure from the base station to the relay based on a correlation between the first positioning information of the relay device and the second positioning information of the UE satisfying a threshold.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for efficient mobility using relay devices as described herein, or the processor 1240 and the memory 1230 may be otherwise configured to perform or support such operations.

Figure 13:
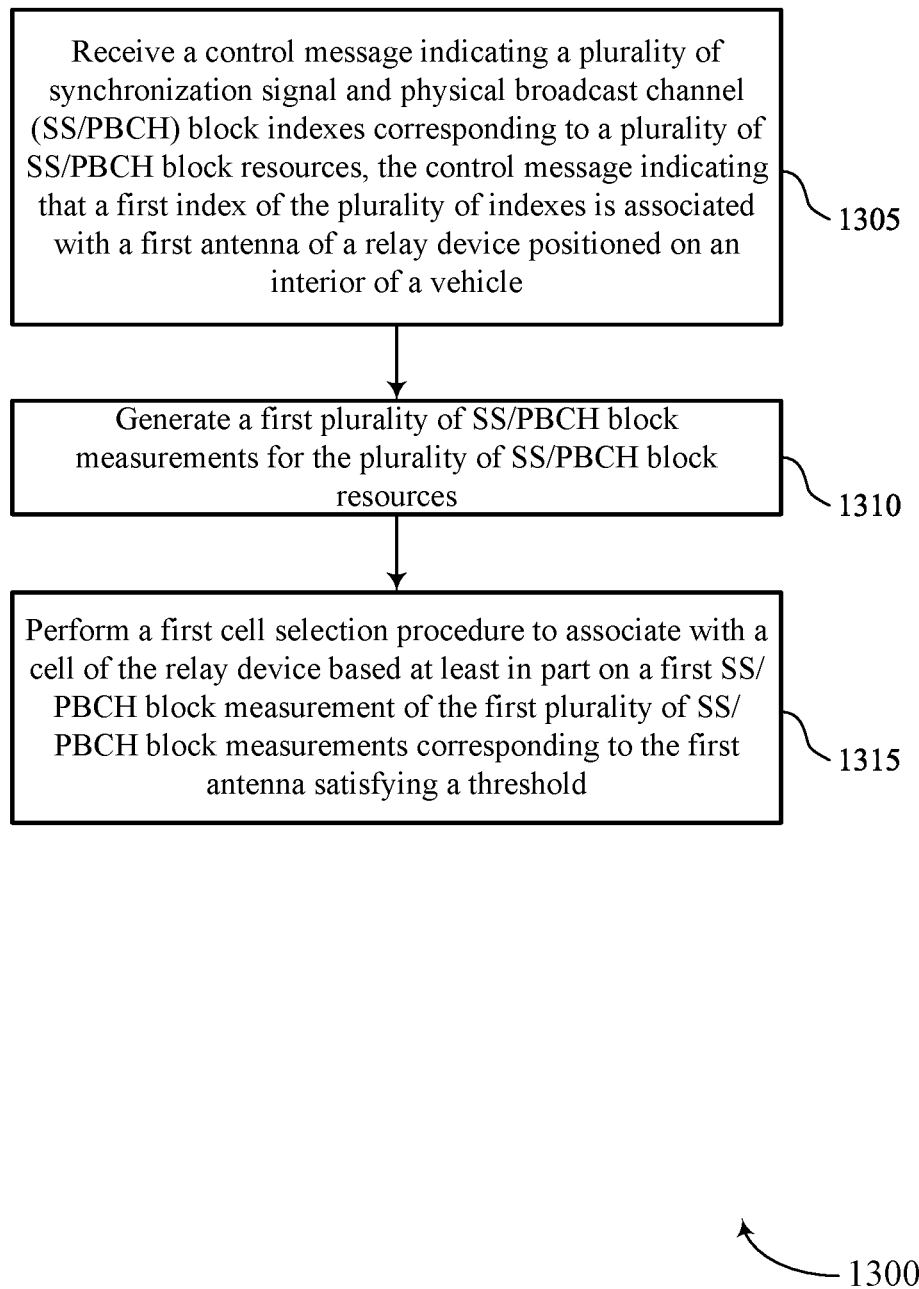
FIGS. 13 through 16 show flowcharts illustrating methods that support techniques for efficient mobility using relay devices in accordance with aspects of the present disclosure.

FIG. 13 shows a flowchart illustrating a method 1300 that supports techniques for efficient mobility using relay devices in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The operations of 1305 may be performed in accordance with examples as disclosed herein. In some examples, aspects of the operations of 1305 may be performed by an SSB configuration component 725 as described with reference to FIG. 7.

At 1310, the method may include generating a first set of multiple SS/PBCH block measurements for the set of multiple SS/PBCH block resources. The operations of 1310 may be performed in accordance with examples as disclosed herein. In some examples, aspects of the operations of 1310 may be performed by an SSB measurement component 730 as described with reference to FIG. 7.

At 1315, the method may include performing a first cell selection procedure to associate with a cell of the relay device based on a first SS/PBCH block measurement of the first set of multiple SS/PBCH block measurements corresponding to the first antenna satisfying a threshold. The operations of 1315 may be performed in accordance with examples as disclosed herein. In some examples, aspects of the operations of 1315 may be performed by a cell selection component 735 as described with reference to FIG. 7.

Figure 14:
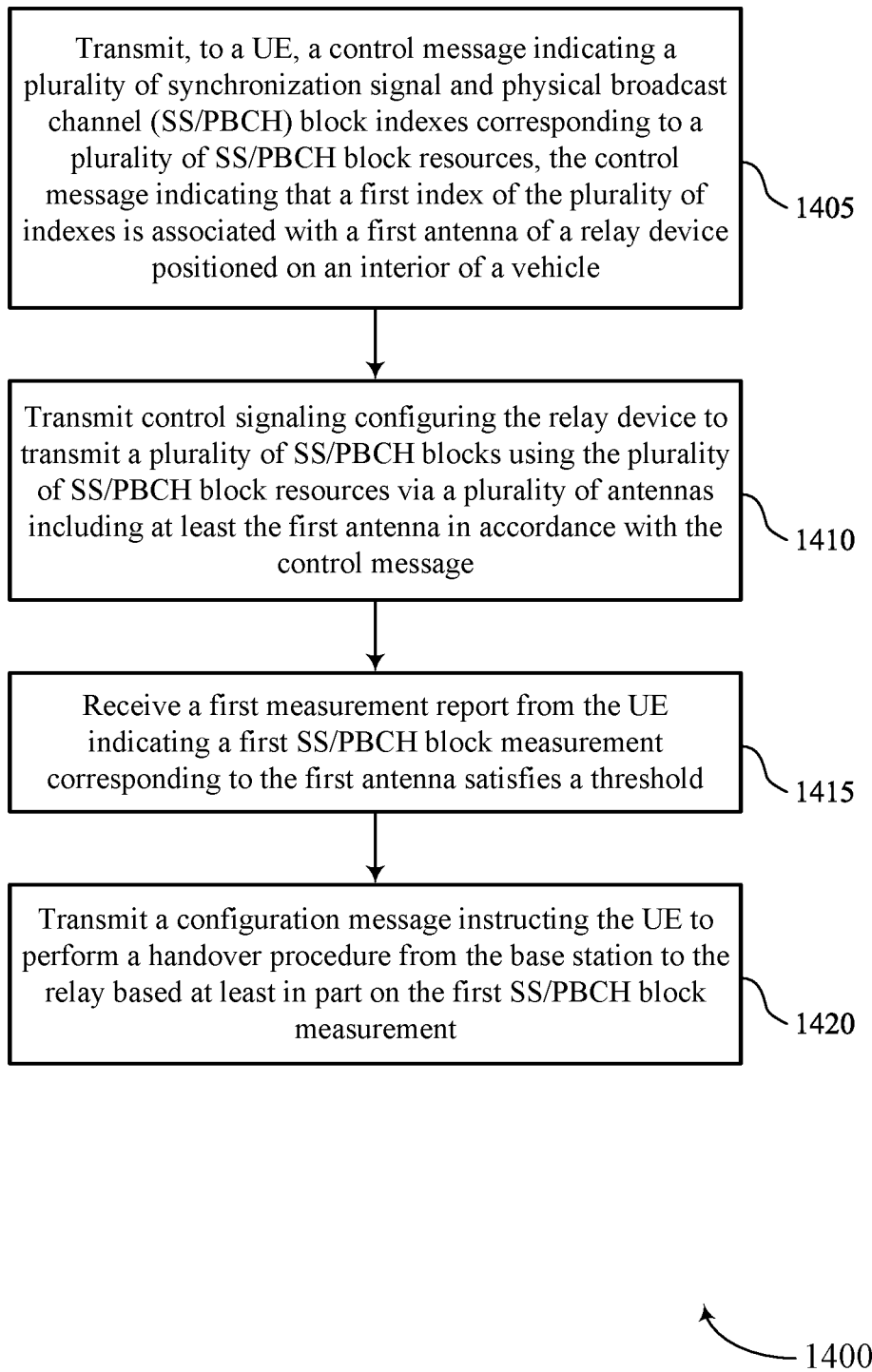

FIG. 14 shows a flowchart illustrating a method 1400 that supports techniques for efficient mobility using relay devices in accordance with aspects of the present disclosure. The operations of the method 1400 may be implemented by a base station or its components as described herein. For example, the operations of the method 1400 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, a control message indicating a set of multiple SS/PBCH block indexes corresponding to a set of multiple SS/PBCH block resources, the control message indicating that a first index of the set of multiple indexes is associated with a first antenna of a relay device positioned on an interior of a vehicle. The operations of 1405 may be performed in accordance with examples as disclosed herein. In some examples, aspects of the operations of 1405 may be performed by an SSB index configuration component 1125 as described with reference to FIG. 11.

At 1410, the method may include transmitting control signaling configuring the relay device to transmit a set of multiple SS/PBCH blocks using the set of multiple SS/PBCH block resources via a set of multiple antennas including at least the first antenna in accordance with the control message. The operations of 1410 may be performed in accordance with examples as disclosed herein. In some examples, aspects of the operations of 1410 may be performed by an SSB transmission configuration component 1130 as described with reference to FIG. 11.

At 1415, the method may include receiving a first measurement report from the UE indicating a first SS/PBCH block measurement corresponding to the first antenna satisfies a threshold. The operations of 1415 may be performed in accordance with examples as disclosed herein. In some examples, aspects of the operations of 1415 may be performed by a measurement report receiving component 1135 as described with reference to FIG. 11.

At 1420, the method may include transmitting a configuration message instructing the UE to perform a handover procedure from the base station to the relay based on the first SS/PBCH block measurement. The operations of 1420 may be performed in accordance with examples as disclosed herein. In some examples, aspects of the operations of 1420 may be performed by a handover configuration component 1140 as described with reference to FIG. 11.

Figure 15:
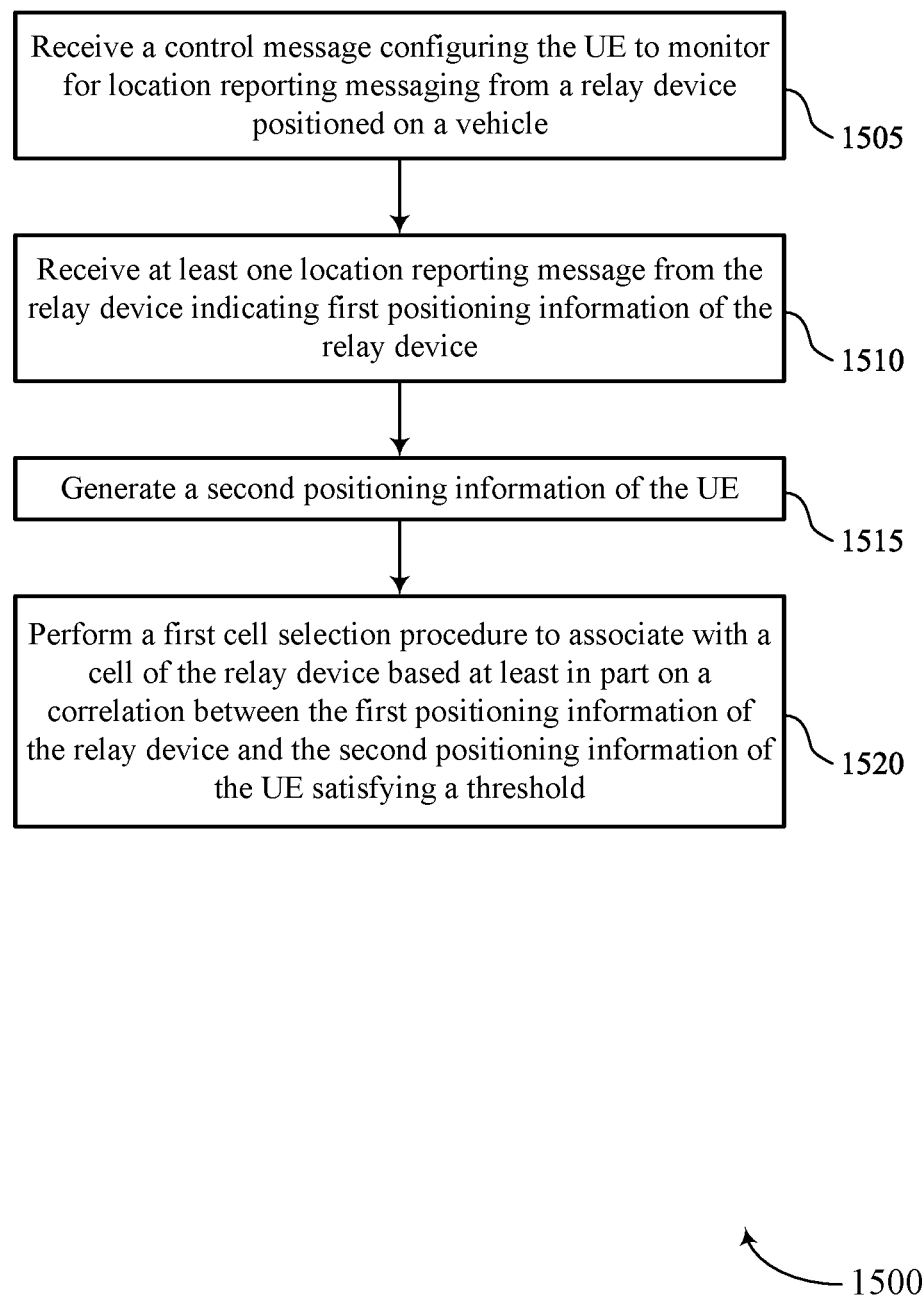

FIG. 15 shows a flowchart illustrating a method 1500 that supports techniques for efficient mobility using relay devices in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a control message configuring the UE to monitor for location reporting messaging from a relay device positioned on a vehicle. The operations of 1505 may be performed in accordance with examples as disclosed herein. In some examples, aspects of the operations of 1505 may be performed by a location report configuration component 740 as described with reference to FIG. 7.

At 1510, the method may include receiving at least one location reporting message from the relay device indicating first positioning information of the relay device. The operations of 1510 may be performed in accordance with examples as disclosed herein. In some examples, aspects of the operations of 1510 may be performed by a location report receiving component 745 as described with reference to FIG. 7.

At 1515, the method may include generating a second positioning information of the UE. The operations of 1515 may be performed in accordance with examples as disclosed herein. In some examples, aspects of the operations of 1515 may be performed by a UE positioning information component 750 as described with reference to FIG. 7.

At 1520, the method may include performing a first cell selection procedure to associate with a cell of the relay device based on a correlation between the first positioning information of the relay device and the second positioning information of the UE satisfying a threshold. The operations of 1520 may be performed in accordance with examples as disclosed herein. In some examples, aspects of the operations of 1520 may be performed by a cell selection component 735 as described with reference to FIG. 7.

Figure 16:
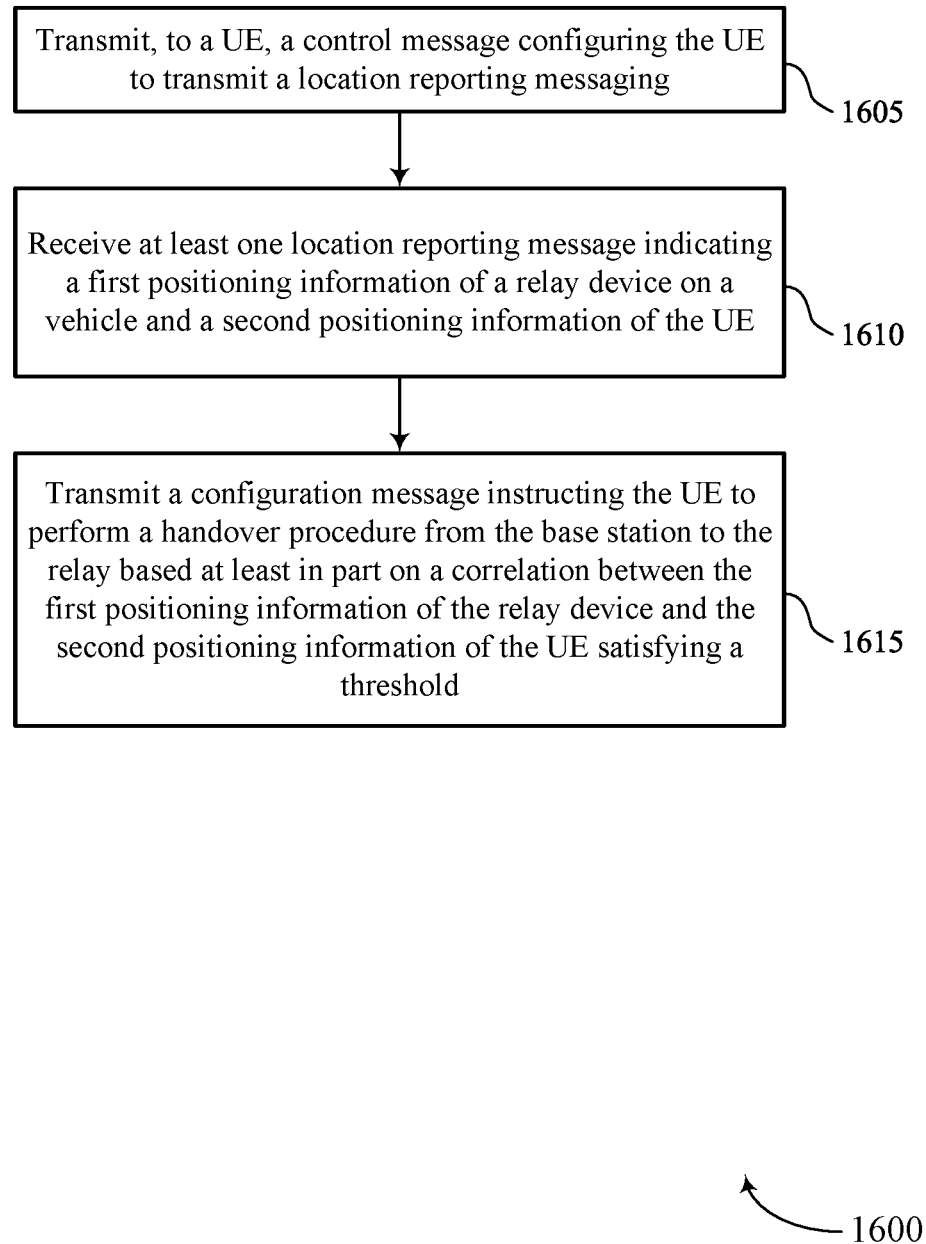

FIG. 16 shows a flowchart illustrating a method 1600 that supports techniques for efficient mobility using relay devices in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a control message configuring the UE to transmit a location reporting messaging. The operations of 1605 may be performed in accordance with examples as disclosed herein. In some examples, aspects of the operations of 1605 may be performed by a location reporting configuring component 1145 as described with reference to FIG. 11.

At 1610, the method may include receiving at least one location reporting message indicating a first positioning information of a relay device on a vehicle and a second positioning information of the UE. The operations of 1610 may be performed in accordance with examples as disclosed herein. In some examples, aspects of the operations of 1610 may be performed by a location report receiving component 1150 as described with reference to FIG. 11.

At 1615, the method may include transmitting a configuration message instructing the UE to perform a handover procedure from the base station to the relay based on a correlation between the first positioning information of the relay device and the second positioning information of the UE satisfying a threshold. The operations of 1615 may be performed in accordance with examples as disclosed herein. In some examples, aspects of the operations of 1615 may be performed by a handover configuration component 1140 as described with reference to FIG. 11.

The following provides an overview of aspects of the present disclosure:

Aspect 1: A method for wireless communications at a UE, comprising: receiving a control message indicating a plurality of SS/PBCH block indexes corresponding to a plurality of SS/PBCH block resources, the control message indicating that a first index of the plurality of indexes is associated with a first antenna of a relay device positioned on an interior of a vehicle; generating a first plurality of SS/PBCH block measurements for the plurality of SS/PBCH block resources; and performing a first cell selection procedure to associate with a cell of the relay device based at least in part on a first SS/PBCH block measurement of the first plurality of SS/PBCH block measurements corresponding to the first antenna satisfying a threshold.

Aspect 2: The method of aspect 1, further comprising: generating a second plurality of SS/PBCH block measurements; and performing a second cell selection procedure based at least in part on a second SS/PBCH block measurement of the second plurality of SS/PBCH block measurements corresponding to the first antenna failing to satisfy the threshold.

Aspect 3: The method of any of aspects 1 through 2, further comprising: generating a second plurality of SS/PBCH block measurements; transmitting a measurement report indicating a second SS/PBCH block measurement of the second plurality of SS/PBCH block measurements.

Aspect 4: The method of aspect 3, further comprising: receiving a configuration message instructing the UE to perform a handover procedure to establish a primary link with the cell of the relay device based at least in part on the second SS/PBCH block measurement satisfying the threshold; and establishing the primary link with the cell of the relay device based at least in part on the configuration message.

Aspect 5: The method of any of aspects 3 through 4, further comprising: receiving a configuration message instructing the UE to establish a secondary link with the cell of the relay device based at least in part on the second SS/PBCH block measurement not satisfying the threshold; and establishing the secondary link with the cell of the relay device based at least in part on the configuration message.

Aspect 6: The method of any of aspects 1 through 5, further comprising: generating a second plurality of SS/PBCH block measurements; and refraining from performing a second cell selection procedure based at least in part on a second SS/PBCH block measurement of the second plurality of SS/PBCH block measurements corresponding to the first antenna satisfying the threshold.

Aspect 7: The method of any of aspects 1 through 6, further comprising: determining that the UE is inside the vehicle based at last in part on the first SS/PBCH block measurement measured by the UE for the first antenna exceeding the threshold.

Aspect 8: The method of any of aspects 1 through 7, further comprising: determining that the UE is inside the vehicle based at last in part on a difference between the first SS/PBCH block measurement measured by the UE for the first antenna and at least one other SS/PBCH block measurement of the first plurality of SS/PBCH block measurements exceeding a second threshold.

Aspect 9: The method of aspect 8, wherein the at least one other SS/PBCH block measurement correspond to one or more antennas of the relay device positioned on an exterior of the vehicle.

Aspect 10: The method of any of aspects 1 through 9, wherein the first SS/PBCH block measurement is a reference signal received power measurement.

Aspect 11: A method for wireless communications at a base station, comprising: transmitting, to a UE, a control message indicating a plurality of SS/PBCH block indexes corresponding to a plurality of SS/PBCH block resources, the control message indicating that a first index of the plurality of indexes is associated with a first antenna of a relay device positioned on an interior of a vehicle; transmitting control signaling configuring the relay device to transmit a plurality of SS/PBCH blocks using the plurality of SS/PBCH block resources via a plurality of antennas including at least the first antenna in accordance with the control message; receiving a first measurement report from the UE indicating a first SS/PBCH block measurement corresponding to the first antenna satisfies a threshold; and transmitting a configuration message instructing the UE to perform a handover procedure from the base station to the relay based at least in part on the first SS/PBCH block measurement.

Aspect 12: The method of aspect 11, further comprising: receiving a second measurement report from the UE indicating a second SS/PBCH block measurement corresponding to the first antenna fails to satisfy the threshold.

Aspect 13: The method of aspect 12, further comprising: configuring the UE to perform a handover from the relay device to the base station based at least in part on the second measurement report.

Aspect 14: The method of any of aspects 12 through 13, further comprising: transmitting a second configuration message instructing the UE to establish a secondary link with the relay device based at least in part on the second SS/PBCH block measurement failing to satisfy the threshold.

Aspect 15: The method of any of aspects 11 through 14, further comprising: receiving a second measurement report from the UE indicating a second SS/PBCH block measurement corresponding to the first antenna satisfies the threshold; and refraining from configuring a handover procedure for the UE based at least in part on the second SS/PBCH block measurement.

Aspect 16: The method of any of aspects 11 through 15, further comprising: determining that the UE is inside the vehicle based at last in part on the first SS/PBCH block measurement corresponding to the first antenna exceeding the threshold.

Aspect 17: The method of any of aspects 11 through 16, further comprising: receiving a second measurement report from the UE indicating a second SS/PBCH block measurement corresponding to a second antenna of the relay device that is positioned on an exterior of the vehicle; and determining that the UE is inside the vehicle based at last in part on a difference between the first SS/PBCH block measurement for the first antenna and the second SS/PBCH block measurement for the second antenna exceeding a second threshold.

Aspect 18: The method of any of aspects 11 through 17, wherein the first SS/PBCH block measurement is a reference signal received power measurement.

Aspect 19: A method for wireless communications at a UE, comprising: receiving a control message configuring the UE to monitor for location reporting messaging from a relay device positioned on a vehicle; receiving at least one location reporting message from the relay device indicating first positioning information of the relay device; generating a second positioning information of the UE; and performing a first cell selection procedure to associate with a cell of the relay device based at least in part on a correlation between the first positioning information of the relay device and the second positioning information of the UE satisfying a threshold.

Aspect 20: The method of aspect 19, further comprising: transmitting a UE location report indicating the first positioning information or the second positioning information, or both.

Aspect 21: The method of aspect 20, further comprising: receiving a configuration message instructing the UE to establish a primary link or a secondary link with the relay device based at least in part on the UE location report.

Aspect 22: The method of any of aspects 19 through 21, further comprising: receive a second location reporting message from the relay device including a third positioning information for the relay device; generating a fourth positioning information of the UE; and performing a second cell selection procedure based at least in part on a second correlation between the third positioning information of the relay device and the fourth positioning information of the UE failing to satisfy the threshold.

Aspect 23: The method of aspect 22, further comprising: determining that the UE is outside of the vehicle based at least in part on the correlation between the third positioning information of the relay device and the fourth positioning information of the UE not satisfying the threshold.

Aspect 24: The method of any of aspects 19 through 23, further comprising: receiving a second location reporting message from the relay device including a third positioning information for the relay device; generating a fourth positioning information of the UE; refraining from performing a second cell selection procedure based at least in part on a second correlation between the third positioning information of the relay device and the fourth positioning information of the UE satisfying the threshold.

Aspect 25: The method of any of aspects 19 through 24, further comprising: determining that the UE is inside the vehicle based at least in part on the correlation between the first positioning information of the relay device and the second positioning information of the UE satisfying the threshold.

Aspect 26: The method of any of aspects 19 through 25, wherein the first positioning information and the second positioning information are based on geolocation information, heading, direction, speed, or any combination thereof.

Aspect 27: The method of any of aspects 19 through 26, wherein the correlation is based at least in part on a commonality between the first positioning information and the second positioning information for at least a threshold interval of time.

Aspect 28: A method for wireless communications at a base station, comprising: transmitting, to a UE, a control message configuring the UE to transmit a location reporting messaging; receiving at least one location reporting message indicating a first positioning information of a relay device on a vehicle and a second positioning information of the UE; and transmitting a configuration message instructing the UE to perform a handover procedure from the base station to the relay based at least in part on a correlation between the first positioning information of the relay device and the second positioning information of the UE satisfying a threshold.

Aspect 29: The method of aspect 28, further comprising: receiving the at least one location reporting message from the UE indicating the first positioning information or the second positioning information, or both.

Aspect 30: The method of aspect 29, further comprising: transmitting a second configuration message instructing the UE to establish a primary link or a secondary link with the relay device based at least in part on the at least one location reporting message.

Aspect 31: The method of any of aspects 28 through 30, further comprising: receive at least a second location reporting message including a third positioning information for the UE and a fourth positioning information of the relay device; and configuring a handover procedure for the UE from the relay device to the base station based at least in part on a second correlation between the third positioning information of the relay device and the fourth positioning information of the UE failing to satisfy the threshold.

Aspect 32: The method of aspect 31, further comprising: determining that the UE is outside of the vehicle based at least in part on the correlation between the third positioning information of the relay device and the fourth positioning information of the UE not satisfying the threshold.

Aspect 33: The method of any of aspects 28 through 32, further comprising: receiving at least a second location reporting message including a third positioning information for the UE and a fourth positioning information of the relay device; and refraining from configuring a handover procedure for the UE based at least in part on a second correlation between the third positioning information of the relay device and the fourth positioning information of the UE satisfying the threshold.

Aspect 34: The method of any of aspects 28 through 33, further comprising: determining that the UE is inside the vehicle based at least in part on the correlation between the first positioning information of the relay device and the second positioning information of the UE satisfying the threshold.

Aspect 35: The method of any of aspects 28 through 34, wherein the first positioning information and the second positioning information are based on geolocation information, heading, direction, speed, or any combination thereof.

Aspect 36: The method of any of aspects 28 through 35, wherein the correlation is based at least in part on a commonality between the first positioning information and the second positioning information for at least a threshold interval of time.

Aspect 37: An apparatus for wireless communications at a UE, comprising a processor; memory coupled with the processor; and instructions stored in the memory and executable by the processor to cause the apparatus to perform a method of any of aspects 1 through 10.

Aspect 38: An apparatus for wireless communications at a UE, comprising at least one means for performing a method of any of aspects 1 through 10.

Aspect 39: A non-transitory computer-readable medium storing code for wireless communications at a UE, the code comprising instructions executable by a processor to perform a method of any of aspects 1 through 10.

Aspect 40: An apparatus for wireless communications at a base station, comprising a processor; memory coupled with the processor; and instructions stored in the memory and executable by the processor to cause the apparatus to perform a method of any of aspects 11 through 18.

Aspect 41: An apparatus for wireless communications at a base station, comprising at least one means for performing a method of any of aspects 11 through 18.

Aspect 42: A non-transitory computer-readable medium storing code for wireless communications at a base station, the code comprising instructions executable by a processor to perform a method of any of aspects 11 through 18.

Aspect 43: An apparatus for wireless communications at a UE, comprising a processor; memory coupled with the processor; and instructions stored in the memory and executable by the processor to cause the apparatus to perform a method of any of aspects 19 through 27.

Aspect 44: An apparatus for wireless communications at a UE, comprising at least one means for performing a method of any of aspects 19 through 27.

Aspect 45: A non-transitory computer-readable medium storing code for wireless communications at a UE, the code comprising instructions executable by a processor to perform a method of any of aspects 19 through 27.

Aspect 46: An apparatus for wireless communications at a base station, comprising a processor; memory coupled with the processor; and instructions stored in the memory and executable by the processor to cause the apparatus to perform a method of any of aspects 28 through 36.

Aspect 47: An apparatus for wireless communications at a base station, comprising at least one means for performing a method of any of aspects 28 through 36.

Aspect 48: A non-transitory computer-readable medium storing code for wireless communications at a base station, the code comprising instructions executable by a processor to perform a method of any of aspects 28 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a control message indicating a plurality of synchronization signal and physical broadcast channel (SS/PBCH) block indexes corresponding to a plurality of SS/PBCH block resources, the control message indicating that a first index of the plurality of indexes is associated with a first antenna of a relay device positioned on an interior of a vehicle;
   generating a first plurality of SS/PBCH block measurements for the plurality of SS/PBCH block resources; and
   performing a first cell selection procedure to associate with a cell of the relay device based at least in part on a first SS/PBCH block measurement of the first plurality of SS/PBCH block measurements corresponding to the first antenna satisfying a threshold.

2. The method of claim 1, further comprising:
   generating a second plurality of SS/PBCH block measurements; and
   performing a second cell selection procedure based at least in part on a second SS/PBCH block measurement of the second plurality of SS/PBCH block measurements corresponding to the first antenna failing to satisfy the threshold.

3. The method of claim 1, further comprising:
   generating a second plurality of SS/PBCH block measurements; and
   transmitting a measurement report indicating a second SS/PBCH block measurement of the second plurality of SS/PBCH block measurements.

4. The method of claim 3, further comprising:
   receiving a configuration message instructing the UE to perform a handover procedure to establish a primary link with the cell of the relay device based at least in part on the second SS/PBCH block measurement satisfying the threshold; and
   establishing the primary link with the cell of the relay device based at least in part on the configuration message.

5. The method of claim 3, further comprising:
   receiving a configuration message instructing the UE to establish a secondary link with the cell of the relay device based at least in part on the second SS/PBCH block measurement not satisfying the threshold; and
   establishing the secondary link with the cell of the relay device based at least in part on the configuration message.

6. The method of claim 1, further comprising:
   generating a second plurality of SS/PBCH block measurements; and
   refraining from performing a second cell selection procedure based at least in part on a second SS/PBCH block measurement of the second plurality of SS/PBCH block measurements corresponding to the first antenna satisfying the threshold.

7. The method of claim 1, further comprising:
   determining that the UE is inside the vehicle based at last in part on the first SS/PBCH block measurement measured by the UE for the first antenna exceeding the threshold.

8. The method of claim 1, further comprising:
   determining that the UE is inside the vehicle based at last in part on a difference between the first SS/PBCH block measurement measured by the UE for the first antenna and at least one other SS/PBCH block measurement of the first plurality of SS/PBCH block measurements exceeding a second threshold.

9. The method of claim 8, wherein the at least one other SS/PBCH block measurement correspond to one or more antennas of the relay device positioned on an exterior of the vehicle.

10. The method of claim 1, wherein the first SS/PBCH block measurement is a reference signal received power measurement.

11. A method for wireless communications at a base station, comprising:
- transmitting, to a user equipment (UE), a control message indicating a plurality of synchronization signal and physical broadcast channel (SS/PBCH) block indexes corresponding to a plurality of SS/PBCH block resources, the control message indicating that a first index of the plurality of indexes is associated with a first antenna of a relay device positioned on an interior of a vehicle;
- transmitting control signaling configuring the relay device to transmit a plurality of SS/PBCH blocks using the plurality of SS/PBCH block resources via a plurality of antennas including at least the first antenna in accordance with the control message;
- receiving a first measurement report from the UE indicating a first SS/PBCH block measurement corresponding to the first antenna satisfies a threshold; and
- transmitting a configuration message instructing the UE to perform a handover procedure from the base station to the relay device based at least in part on the first SS/PBCH block measurement.

12. The method of claim 11, further comprising:
- receiving a second measurement report from the UE indicating a second SS/PBCH block measurement corresponding to the first antenna fails to satisfy the threshold.

13. The method of claim 12, further comprising:
- configuring the UE to perform a handover from the relay device to the base station based at least in part on the second measurement report.

14. The method of claim 12, further comprising:
- transmitting a second configuration message instructing the UE to establish a secondary link with the relay device based at least in part on the second SS/PBCH block measurement failing to satisfy the threshold.

15. The method of claim 11, further comprising:
- receiving a second measurement report from the UE indicating a second SS/PBCH block measurement corresponding to the first antenna satisfies the threshold; and
- refraining from configuring a handover procedure for the UE based at least in part on the second SS/PBCH block measurement.

16. The method of claim 11, further comprising:
- determining that the UE is inside the vehicle based at last in part on the first SS/PBCH block measurement corresponding to the first antenna exceeding the threshold.

17. The method of claim 11, further comprising:
- receiving a second measurement report from the UE indicating a second SS/PBCH block measurement corresponding to a second antenna of the relay device that is positioned on an exterior of the vehicle; and
- determining that the UE is inside the vehicle based at last in part on a difference between the first SS/PBCH block measurement for the first antenna and the second SS/PBCH block measurement for the second antenna exceeding a second threshold.

18. The method of claim 11, wherein the first SS/PBCH block measurement is a reference signal received power measurement.

19. A user equipment (UE), comprising:
- one or more memories storing processor-executable code; and
- one or more processors coupled with the one or more memories and individually or collectively operable to execute the code to cause the UE to:
  - receive a control message indicating a plurality of synchronization signal and physical broadcast channel (SS/PBCH) block indexes corresponding to a plurality of SS/PBCH block resources, the control message indicating that a first index of the plurality of indexes is associated with a first antenna of a relay device positioned on an interior of a vehicle;
  - generate a first plurality of SS/PBCH block measurements for the plurality of SS/PBCH block resources; and
  - perform a first cell selection procedure to associate with a cell of the relay device based at least in part on a first SS/PBCH block measurement of the first plurality of SS/PBCH block measurements corresponding to the first antenna satisfying a threshold.

20. The UE of claim 19, wherein the one or more processors are individually or collectively further operable to execute the code to cause the UE to:
- generate a second plurality of SS/PBCH block measurements; and
- perform a second cell selection procedure based at least in part on a second SS/PBCH block measurement of the second plurality of SS/PBCH block measurements corresponding to the first antenna failing to satisfy the threshold.

21. The UE of claim 19, wherein the one or more processors are individually or collectively further operable to execute the code to cause the UE to:
- generate a second plurality of SS/PBCH block measurements; and
- transmit a measurement report indicating a second SS/PBCH block measurement of the second plurality of SS/PBCH block measurements.

22. The UE of claim 21, wherein the one or more processors are individually or collectively further operable to execute the code to cause the UE to:
- receive a configuration message instructing the UE to perform a handover procedure to establish a primary link with the cell of the relay device based at least in part on the second SS/PBCH block measurement satisfying the threshold; and
- establish the primary link with the cell of the relay device based at least in part on the configuration message.

23. The UE of claim 21, wherein the one or more processors are individually or collectively further operable to execute the code to cause the UE to:
- receive a configuration message instructing the UE to establish a secondary link with the cell of the relay device based at least in part on the second SS/PBCH block measurement not satisfying the threshold; and
- establish the secondary link with the cell of the relay device based at least in part on the configuration message.

24. The UE of claim 19, wherein the one or more processors are individually or collectively further operable to execute the code to cause the UE to:
- generate a second plurality of SS/PBCH block measurements; and
- refrain from performing a second cell selection procedure based at least in part on a second SS/PBCH block measurement of the second plurality of SS/PBCH block measurements corresponding to the first antenna satisfying the threshold.

25. The UE of claim 19, wherein the one or more processors are individually or collectively further operable to execute the code to cause the UE to:

determine that the UE is inside the vehicle based at last in part on the first SS/PBCH block measurement measured by the UE for the first antenna exceeding the threshold.

26. The UE of claim 19, wherein the one or more processors are individually or collectively further operable to execute the code to cause the UE to:
determine that the UE is inside the vehicle based at last in part on a difference between the first SS/PBCH block measurement measured by the UE for the first antenna and at least one other SS/PBCH block measurement of the first plurality of SS/PBCH block measurements exceeding a second threshold.

27. The UE of claim 26, wherein the at least one other SS/PBCH block measurement correspond to one or more antennas of the relay device positioned on an exterior of the vehicle.

28. The UE of claim 19, wherein the first SS/PBCH block measurement is a reference signal received power measurement.

29. A base station, comprising:
one or more memories storing processor-executable code; and
one or more processors coupled with the one or more memories and individually or collectively operable to execute the code to cause the base station to:
transmit, to a user equipment (UE), a control message indicating a plurality of synchronization signal and physical broadcast channel (SS/PBCH) block indexes corresponding to a plurality of SS/PBCH block resources, the control message indicating that a first index of the plurality of indexes is associated with a first antenna of a relay device positioned on an interior of a vehicle;
transmit control signaling configuring the relay device to transmit a plurality of SS/PBCH blocks using the plurality of SS/PBCH block resources via a plurality of antennas including at least the first antenna in accordance with the control message;
receive a first measurement report from the UE indicating a first SS/PBCH block measurement corresponding to the first antenna satisfies a threshold; and
transmit a configuration message instructing the UE to perform a handover procedure from the base station to the relay device based at least in part on the first SS/PBCH block measurement.

30. The base station of claim 29, wherein the one or more processors are individually or collectively further operable to execute the code to cause the base station to:
receive a second measurement report from the UE indicating a second SS/PBCH block measurement corresponding to the first antenna fails to satisfy the threshold.

* * * * *